United States Patent
Uchiyama et al.

(10) Patent No.: US 12,411,103 B2
(45) Date of Patent: Sep. 9, 2025

(54) ELECTRODE, METHOD FOR MANUFACTURING ELECTRODE, ION SENSOR, IN-VIVO COMPONENT MEASURING DEVICE, AND IN-VIVO COMPONENT MEASURING METHOD

(71) Applicant: SYSMEX CORPORATION, Kobe (JP)

(72) Inventors: Kenichi Uchiyama, Kobe (JP); Junko Kojima, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 407 days.

(21) Appl. No.: 17/853,991

(22) Filed: Jun. 30, 2022

(65) Prior Publication Data

US 2022/0334077 A1    Oct. 20, 2022

Related U.S. Application Data

(63) Continuation of application No. PCT/JP2020/048407, filed on Dec. 24, 2020.

(30) Foreign Application Priority Data

Jan. 10, 2020    (JP) .................................. 2020-003117

(51) Int. Cl.
*G01N 27/333*    (2006.01)
*G01N 27/30*    (2006.01)
*G01N 27/406*    (2006.01)

(52) U.S. Cl.
CPC ......... *G01N 27/333* (2013.01); *G01N 27/301* (2013.01); *G01N 27/406* (2013.01)

(58) Field of Classification Search
CPC .. G01N 27/333; G01N 27/301; G01N 27/406; G01N 27/3335
See application file for complete search history.

(56) References Cited

U.S. PATENT DOCUMENTS

| | | | |
|---|---|---|---|
| 5,120,422 A | 6/1992 | Liu et al. | |
| 6,805,781 B2 | 10/2004 | Sorensen et al. | |
| 2005/0126929 A1* | 6/2005 | Mansouri | G01N 27/38 |
| | | | 205/703 |
| 2010/0160758 A1* | 6/2010 | Okada | A61B 5/7242 |
| | | | 600/365 |

(Continued)

FOREIGN PATENT DOCUMENTS

| CN | 1788373 A | 6/2006 |
|---|---|---|
| CN | 101523201 A | 9/2009 |

(Continued)

OTHER PUBLICATIONS

Ikejiri et al., JP2018018578A, English translation, 2018 (Year: 2018).*

(Continued)

*Primary Examiner* — Luan V Van
*Assistant Examiner* — Shizhi Qian
(74) *Attorney, Agent, or Firm* — METROLEX IP LAW GROUP, PLLC; Robert Scott, Esq.

(57) ABSTRACT

An electrode with higher potential stability for repeated use and/or long-term use in an ion sensor is provided. The electrode includes an internal solid layer containing a metal oxide and a solid electrolyte and an electrode material.

20 Claims, 20 Drawing Sheets

(56) References Cited

U.S. PATENT DOCUMENTS

| | | | | |
|---|---|---|---|---|
| 2011/0272280 | A1* | 11/2011 | Tsukada | G01N 27/333 |
| | | | | 204/416 |
| 2014/0158536 | A1* | 6/2014 | Thompson | G01N 27/333 |
| | | | | 204/406 |
| 2019/0195824 | A1* | 6/2019 | Speck | G01N 27/301 |
| 2020/0088670 | A1* | 3/2020 | Vepsäläinen | G01N 27/4035 |
| 2020/0116664 | A1* | 4/2020 | Abeyrathne | G01N 27/301 |

FOREIGN PATENT DOCUMENTS

| | | | |
|---|---|---|---|
| CN | 109580750 | A * | 4/2019 |
| CN | 109952280 | A | 6/2019 |
| JP | S63-60152 | A | 3/1988 |
| JP | S64-26141 | A | 1/1989 |
| JP | H4-19554 | A | 1/1992 |
| JP | H6-505559 | A | 6/1994 |
| JP | 2935768 | B2 | 8/1999 |
| JP | 2002-107329 | A | 4/2002 |
| JP | 2003-329644 | A | 11/2003 |
| JP | 3635263 | B2 | 4/2005 |
| JP | 2015-076210 | A | 4/2015 |
| JP | 2018018578 | A * | 2/2018 |
| JP | 2018-080963 | A | 5/2018 |
| JP | 2019-505961 | A | 2/2019 |
| JP | 6494770 | B2 | 4/2019 |
| WO | 2008/032790 | A1 | 3/2008 |

OTHER PUBLICATIONS

Komaba et al., All-solid-state ion-selective electrodes with redox-active lithium, sodium, and potassium insertion materials as the inner solid-contact layers, Analyst, 2017, 142, 3857 (Year: 2017).*
Chou et al., Differential type solid-state urea biosensors based on ion-selective electrodes, Sensors and Actuators B, 2008, 130, 359-366 (Year: 2008).*
Bobacka et al., Single-piece all-solid-state ion-selective electrode, Anal. Chem., 1995, 67, 3819-3823 (Year: 1995).*
Wang et al.. All-solid-state blood calcium sensors based on screen-printed poly(3,4-ethylenedioxythiophene) as the solid contact, Sensors and Actuators B, 2012, 173, 630-635 (Year: 2012).*
Miyake et al., Ion-selective electrodes with unusual response functions: simultaneous formation of ionophore-primary ion complexes with different Stoichiometries, Anal. Chem., 2012, 84, 1104-1111 (Year: 2012).*
Boilot et al., X-ray-scattering study of the fast-ion conductor "-alumina, Physical Review B, 1980, 22, 5912-5923 (Year: 1980).*
Mousavi et al., An analytical quality solid-state composite reference electrode, Analyst, 2013, 138, 5216. (Year: 2013).*
M. Sheliakina et al., "An all-solid-state biocompatible ion-to-electron transducer for bioelectronics", Jan. 17, 2018, Downloaded on Jun. 2, 2022, pp. 256-263, Mater. Horiz., The Royal Society of Chemistry 2018.
Shinichi Komaba et al., "All-Solid-State Ion-Selective Electrodes with Redox-Active Lithium, Sodium, and Potassium Insertion Materials as the Inner Solid-Contact Layer", pp. 3857-3966, S1-14 (Supplementary Information), vol. 142, Analyst, The Royal Society of Chemistry 2017; Cited in the Specification and ISR.
"β-alumina solid electrolyte", retrieved on Jun. 2022 from the website Wikipedia.
Toru Sakaki, "Electrolyte measurement principle by ion-selective electrode (ISE) method", Jan. 2007, retrieved on Jun. 9, 2022, vol. 35 No. 1, Inspection and technology.
Sauvage et al., "Study of the potentiometric response towards sodium ions of Na0.44—xMnO2 for the development of selective sodium ion sensors", Jan. 17, 2006, pp. 638-644, vol. 120, Sensors and Actuators B 2007, Cited in the ISR.
Tani et al, "Alkali Metal Ion-Selective Electrodes Based on Relevant Alkali Metal lon Doped Manganese Oxides" pp. 81-90, vol. 129, No. 1-2, Mikrochim. Acta 1998, Cited in the ISR.
The International Search Report("ISR") of PCT/JP2020/048407 mailed on Mar. 30, 2021.
Japanese Office Action ("JPOA") issued on Jun. 11, 2024 in a counterpart Japanese patent application No. 2021-569834.
Shinichi Komaba et al., "All-Solid-State Ion-Selective Electrodes with Redox-Active Lithium, Sodium, and Potassium Insertion Materials as the Inner Solid-Contact Layer", Analyst, Royal Society of Chemistry, UK, vol. 142, No. 20, Oct. 21, 2017 (Oct. 21, 2017), p. 3857-3866, XP009537358, ISSN: 0003-2654, DOI: 10.1039/C7AN01068K [retrieved on Aug. 21, 2017] ; Cited in the ESSR issued on Nov. 22, 2023 in a counterpart European patent application.
Kojima Junko et al., "Influence of solid electrolyte upon the repeatability and reproducibility of all-solid-state ion-selective electrodes with inorganic insertion material paste", Electrochimica Acta, vol. 373, Feb. 3, 2021 (Feb. 3, 2021), p. 1-7, XP093020045, Amsterdam, NL ISSN: 0013-4686, DOI: 10.1016/j.electacta.2021. 137896; Cited in the ESSR issued on Nov. 22, 2023 in a counterpart European patent application.
Kojima Junko et al, "Application of a novel ionic-liquid-based membrane reference electrode with inorganic insertion material paste to a calibration-free all-solid-state ion sensor chip", Sensors and Actuators B: Chemical, Elsevier BV, NL, vol. 347, Aug. 18, 2021 (Aug. 18, 2021), XP086781417, ISSN: 0925-4005, DOI: 10.1016/J.SNB.2021.130625 [retrieved on Aug. 18, 2021]; Cited in the ESSR issued on Nov. 22, 2023 in a counterpart European patent application.
An extended European search report (EESR) issued on Nov. 23, 2023 in a counterpart European patent application.
An Office Action (CNOA) issued on Mar. 23, 2024 in a counterpart Chinese patent application No. 202080092142.9.

* cited by examiner

ELECTRODE, METHOD FOR MANUFACTURING ELECTRODE, ION SENSOR, IN-VIVO COMPONENT MEASURING DEVICE, AND IN-VIVO COMPONENT MEASURING METHOD

CROSS REFERENCE TO RELATED APPLICATIONS

This application claims priority from prior Japanese Patent Application(s) No. 2020-003117, filed on Jan. 10, 2020, entitled "ELECTRODE, METHOD FOR MANUFACTURING ELECTRODE, ION SENSOR, IN-VIVO COMPONENT MEASURING DEVICE, AND IN-VIVO COMPONENT MEASURING METHOD", the entire contents of which are incorporated herein by reference.

TECHNICAL FIELD

The disclosure relates to an electrode, a method for manufacturing an electrode, an ion sensor, an in-vivo component measuring device, and an in-vivo component measuring method.

BACKGROUND

All-solid-state ion-selective electrodes and ion sensors using them are well known. For example, Non-Patent Document 1 discloses an all-solid-state ion-selective electrode using an insertion material ($Na_{0.33}MnO_2$, $Li_aFePO_4$, $K_{bb}MnO_2 \cdot MH_2O$) used as an electrode material as a secondary battery as an internal layer. This involves laminating an internal solid layer configured by mixing $Na_{0.33}MnO_2$, $Li_aFePO_4$, or $K_bMnO_2 \cdot mH_2O$ with a conductive agent (acetylene black) and a binder (PVDF) on a platinum electrode, and further laminating on top of this an ion-selective film configured by blending an ionophore, a plasticizer and an anion exclusion agent on a base material (polyvinyl chloride) to form the electrode.

PRIOR ART DOCUMENTS

Shinichi Komaba, et al., "All-solid-state ion-selective electrodes with redox-active lithium, sodium, and potassium insertion materials as the inner solid-contact layer" Analyst, 142 (20), 3857-3866 (2017).

SUMMARY

As the present inventors proceed with research to obtain higher quality electrodes, the potential of a conventional electrode of an ion sensor becomes unstable due to repeated use and/or long-term use, and the potential was found to change. This potential instability leads to an increase in the frequency of calibration and an increase in the frequency of electrode replacement. For this reason, a conventional ion sensor is calibrated for each measurement or for each measurement at a predetermined time interval. Therefore, one or more embodiments of the invention aims to provide an electrode having higher potential stability for repeated use and/or long-term use in an ion sensor.

As a result of diligent research in view of the above problems, the present inventors have found that the above problems can be solved if the electrode includes an internal solid layer containing a metal oxide and a solid electrolyte, and an electrode material. The present inventors have completed the present invention as a result of further research based on this finding.

That is, one or more embodiments may include the following aspects.

Item A. An electrode including an internal solid layer containing a metal oxide and a solid electrolyte, and an electrode material.

Item B. A method for manufacturing an electrode, which comprises forming an internal solid layer containing a metal oxide and a solid electrolyte on the electrode material.

Item C. An ion sensor comprising an insulating substrate and the electrode according to Item A disposed on the insulating substrate.

Item D. An in-vivo component measuring device including the ion sensor according to Item C, which measures the sodium ion concentration contained in the tissue fluid collected from a subject.

Item E. An in-vivo component measuring method including the ion sensor according to Item C, which measures the sodium ion concentration contained in the tissue fluid collected from a subject.

According to one or more embodiments, it may be possible to provide an electrode having higher potential stability for repeated use and/or long-term use in an ion sensor.

DETAILED DESCRIPTION

Figure 1:
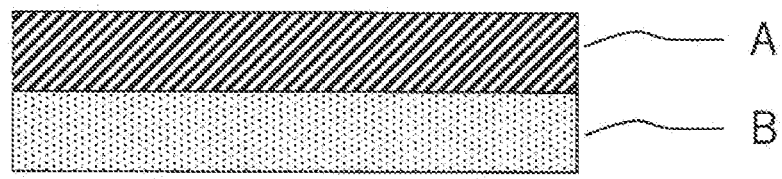
FIG. 1 is a schematic cross-section showing an example of an electrode according to one or more embodiments.

In the present specification, the expressions "contains" and "includes" include the concepts of "contains", "includes", "substantially consists" and "consists of only".

1. Electrode

The present invention relates to an electrode (sometimes referred to as "the electrode of the present invention" in the present invention) including an internal solid layer containing a metal oxide and a solid electrolyte and an electrode material in one embodiment thereof. This will be described below.

The metal oxide is not particularly limited insofar as it can be used for the electrode of the ion sensor. When the electrode of the present invention is used as an ion-selective electrode in an ion sensor, it is preferable to use a substance (ion-electron conductor) capable of inserting and removing the measured ion in the crystal structure with the transfer of electrons.

The measurement ion is not particularly limited, and examples thereof include sodium ion, potassium ion, calcium ion, magnesium ion and the like, preferably sodium ion, potassium ion and the like, and particularly preferably sodium ion.

The metal oxide can be appropriately selected in accordance with the measurement ion. Examples of suitable metal oxide include: $M_{xx}MnO_2$, $M_{xx}NiO_2$, $M_{xx}CoO_2$, $M_{xx}Ni_{0.5}Mn_{0.5}O_2$, $M_{xx}FeO_2$, $M_{2/3}Fe_{1/3}Mn_{2/3}O_2$, $M_{xx}Ni_{1/3}Co_{1/3}Mn_{1/3}O_2$, $M_{xx}Ni_{0.5}Ti_{0.5}O_2$, $M_{xx}VO_2$, $M_{xx}CrO_2$, $M_{xx}FePO_4$ and the like (where, in the equation, M is Na or K independently, and x indicates an arbitrary positive number). Among these, $M_xMnO_2$ is preferable, and $Na_xMnO_2$ is particularly preferable.

In this case, x is usually $0<x\leq1$. Additionally, x is preferably 0.15 to 0.66, more preferably 0.2 to 0.5, still more preferably 0.22 to 0.28, 0.30 to 0.36, or 0.41 to 0.47, and particularly preferably 0.245 to 0.255, 0.325 to 0.335, or 0.435 to 0.445.

The crystal structure of the metal oxide is not particularly limited insofar as it can be used as an electrode of an ion sensor. Examples of the crystal structure include an orthorhombic crystal structure, a tetragonal crystal structure, a trigonal crystal structure, a hexagonal crystal structure, a cubic crystal structure, a triclinic crystal structure, a monoclinic crystal structure, and the like; and among these, an orthorhombic crystal structure is preferable.

The form of the metal oxide is not particularly limited, but is preferably in the form of particles. The particles of the metal oxide have an arbitrary shape such as a flake-like shape, a rod-like shape, a columnar shape, a spherical shape, and an ellipsoidal shape, and are preferably a flake-like shape.

The average particle size of the metal oxide particles is preferably 1 to 20 μm, more preferably 2 to 15 μm, and ideally 5 to 12 μm, from the viewpoint of enhancing the adhesion between the metal oxide and the solid electrolyte and enhancing the performance as an electrode of the ion sensor. Note that the average particle size can be measured by a laser diffraction/scattering type particle size distribution measuring device.

The metal oxide also may be one type used alone or in combination of two or more types.

The content of the metal oxide is, for example, 20 to 70% by mass, preferably 25 to 65% by mass, and more preferably 30 to 60% by mass with respect to 100% by mass of the internal solid layer.

The solid electrolyte is not particularly limited insofar as it is a solid in which ions can be conducted. When the electrode of the present invention is used as an ion-selective electrode in an ion sensor, a solid electrolyte capable of conducting measurement ions can be used. Typically, as the solid electrolyte, ionic (measured ion) conductive ceramics can be used.

The measurement ion is not particularly limited, and examples thereof include sodium ion, potassium ion, calcium ion, magnesium ion and the like, sodium ion, potassium ion and the like is preferred, and particularly preferably sodium ion.

The solid electrolyte can be appropriately selected depending on the measurement ion. Specific examples of the solid electrolyte include oxide-based solid electrolytes such as β"-alumina, β-alumina, perovskite-type oxides, NASICON-type oxides, and garnet-type oxides, sulfide-based solid electrolytes, stabilized zirconia, and α-silver iodide, zeolite (the zeolite may internally contain cations such as Na ion, K ion, and H ion) and the like. Among these, β"-alumina, β-alumina, zeolite and the like are particularly preferable from the viewpoint of high stability to water and suitable use as an electrode of an ion sensor.

β"-/β-alumina contains a layered structure consisting of an ionic conduction layer and a spinel block, and movement of ions (measured ions) occurs in the ionic conduction layer. β"-alumina and β-alumina are different in crystal structure, and among them, β"-alumina has a higher sodium ion content in the crystal structure and relatively higher ionic conductivity. The β"-/β-alumina is preferably Na-β"-/β-alumina capable of conducting sodium ions. Na-β"-alumina usually has a chemical composition of $Na_2O \cdot xAl_2O_3$ (where x=5 to 7). In addition, Na-β alumina usually has a chemical composition of $Na_2O \cdot xAl_2O_3$ (where x=9 to 11).

The form of the solid electrolyte is not particularly limited, but it is preferably in the form of particles. The particles of the solid electrolyte have an arbitrary shape such as a flake-like shape, a rod-like shape, a columnar shape, a spherical shape, and an ellipsoidal shape.

The average particle size of the particles of the solid electrolyte is preferably 0.02 to 3 μm, more preferably 0.1 to 1 μm, and still more preferably 0.15 to 0.5 μm in an aspect the present invention from the viewpoint that the adhesion between the metal oxide and the solid electrolyte and can enhance the performance as an electrode of the ion sensor. From the same viewpoint, the average particle size of the particles of the solid electrolyte is preferably 0.02 to 7, more preferably 0.05 to 5, and still more preferably 0.1 to 3 μm in another aspect of the present invention. Note that the average particle size can be measured by a laser diffraction/scattering type particle size distribution measuring device.

In the inner solid layer, it is preferable that the average particle size of the solid electrolyte is smaller than the average particle size of the metal oxide. Specifically, in one aspect of the present invention, the average particle size of the solid electrolyte is, for example, 0.1 to 30, preferably 0.5 to 10, and more preferably 1 to 5 with respect to the average particle size 100 of the metal oxide. In another aspect of the present invention, the average particle size of the solid electrolyte is, for example, 0.1 to 70, preferably 0.5 to 60, and more preferably 1 to 5 with respect to the average particle size 100 of the metal oxide.

The solid electrolyte also may be used alone or in combination of two or more.

The content of the solid electrolyte is, for example, 15 to 70% by mass, preferably 20 to 65% by mass, and more preferably 25 to 60% by mass with respect to 100% by mass of the internal solid layer.

The mass ratio of the metal oxide to the solid electrolyte (metal oxide:solid electrolyte) in the inner solid layer is, for example, 5:1 to 1:5, preferably 2:1 to 1:2, more preferably 1.5:1 to 1:1.5, still more preferably 1.2:1 to 1:1.2, and even more preferably 1.1:1 to 1:1.1.

The inner solid layer preferably contains a conductive agent. As a result, the conductivity of the internal solid layer can be improved, the buffering action against volume changes due to the ingress and egress of ions can be improved, and the electrode stability can be improved.

The conductive agent is not particularly limited, and examples of usable carbon materials include graphite powder, conductive fibers such as metal fibers, carbon fluoride, and the like; metal powders such as aluminum, conductive whiskers such as zinc oxide and potassium titanate; conductive metal oxides such as titanium oxide, organic conductive materials such as phenylene derivatives and graphene derivatives. Among these, a carbon material is preferable.

The conductive agent also may be used alone or in combination of two or more.

The content of the conductive agent is, for example, 0.1 to 20% by mass, preferably 1 to 15% by mass, and more preferably 2 to 10% by mass with respect to 100% by mass of the internal solid layer.

The mass ratio of the metal oxide (or solid electrolyte) to the conductive agent in the inner solid layer (metal oxide (or solid electrolyte):conductive agent) is, for example, 20:1 to 1:1, preferably 15:1 to 3:1, and ideally 10:1 to 6:1.

The inner solid layer preferably contains a binder. In this way each component in the inner solid layer can be bound more firmly.

The binding agent is not particularly limited, and examples of usable binding agents include: polyacrylic acid vinylidene, polyvinylpyrrolidone, polytetrafluoroethylene, polyethylene, polypropylene, aramid resin, polyamide, polyimide, polyamideimide, polyacrylic nitrile, polyacrylic acid, polyacrylic acid methyl ester, polyacrylic acid ethyl ester, polyacrylic acid hexyl Esters, polymethacrylic acid, polymethacrylic acid methyl ester, polymethacrylic acid ethyl ester, polymethacrylic acid hexyl ester, acrylic emulsion, polyvinyl acetate, polyvinylpyrrolidone, polyether, polyether sulfone, hexafluoropolypropylene, styrene butadiene rubber, carboxy polymers such as methylcellulose, compounds having a skeleton similar to these polymers, and composite agents consisting of multiple polymers. Among these, preferred examples include polyvinylidene fluoride, a mixture containing styrene-butadiene latex and carboxymethyl cellulose (SBR/CMC), a mixture containing polyamideimide and carbodiimide, polytetrafluoroethylene, an acrylic emulsion and the like, and polyvinylidene fluoride is preferable.

The binder also may be used alone or in combination of two or more.

The content of the binder is, for example, 0.1 to 20% by mass, preferably 1 to 15% by mass, and more preferably 2 to 10% by mass with respect to 100% by mass of the internal solid layer.

The mass ratio of the metal oxide (or solid electrolyte) to the binder (metal oxide (or solid electrolyte):binder) in the inner solid layer is, for example, 20:1 to 1:1, preferably 15:1 to 3:1, and more preferably 10:1 to 6:1.

The inner solid layer also may contain components other than the above. Other components include, for example, solid electrolytes and raw materials for producing metal oxides, such as $MnCO_3$, $Na_2CO_3$, $Al_2O_3$ and the like.

The total content of the metal oxide and the solid electrolyte in the inner solid layer (the total content including the conductive agent and the binder, if any) is based on 100% by mass of the inner solid layer, the total content is 70 to 100% by mass, preferably 80 to 100% by mass, more preferably 90 to 100% by mass, still more preferably 95 to 100% by mass, and even more preferably 99 to 100% by mass.

The layer structure of the inner solid layer is not particularly limited. The inner solid layer may be a single-layer structure composed of one layer having a single composition, or may be a multi-layer structure composed of a plurality of layers having the same or different compositions from each other.

The thickness of the inner solid layer is not particularly limited insofar as the conductivity is not significantly impaired. The thickness is, for example, 1 to 200 µm. From the viewpoint of production efficiency, production cost, and the like, the thickness is preferably 1 to 100 µm, more preferably 1 to 50 µm, and even more preferably 1 to 20 µm.

The electrode material is not particularly limited insofar as it contains a conductive material. Examples of the conductive material include metals such as platinum, gold, silver, copper, carbon, palladium, chromium, aluminum and nickel, alloys containing at least one of these metals, and metal halides such as chlorides of these metals and the like. Among these, platinum, gold, silver, palladium, aluminum, nickel, carbon and the like are preferable. The conductive material may be used alone or in combination of two or more.

The content of the conductive material is, for example, 70 to 100% by mass, preferably 85 to 100% by mass, and more preferably 95 to 100% by mass with respect to 100% by mass of the electrode material.

The shape of the electrode material is not particularly limited, but it is usually flat.

The layer structure of the electrode material is not particularly limited. The electrode material also may have a single-layer structure composed of one layer having a single composition, or may have a multi-layer structure composed of a plurality of layers having the same or different compositions from each other.

The thickness of the electrode material is not particularly limited insofar as the conductivity is not significantly impaired. The thickness is, for example, 1 to 10 µm. From the viewpoint of manufacturing efficiency, manufacturing cost, and the like, the thickness is preferably 1 to 5 µm.

In the electrode of the present invention, an internal solid layer is usually arranged directly on the electrode material or via another layer. Preferably, the internal solid layer is placed directly on the electrode material. An embodiment of the electrode of the present invention is shown in FIG. 1. In the electrode, it is preferable to arrange the internal solid layer so as to cover the side surface of the electrode material, to provide a side wall, and the like so that the electrode material is not exposed.

The electrode of the present invention can be preferably used as an ion-selective electrode, a reference electrode and the like.

When the electrode of the present invention is used as an ion-selective electrode, it is preferable that the electrode of the present invention further contains an ion-selective membrane. The ion-selective membrane contains an ion-selective substance.

As the ion-selective substance, conventionally known ionophores or synthetic substances can be widely used. The ion-selective substance can be selected according to the measurement ion. As the ion-selective substance, ionophore is preferably used. Examples of ionophores include valinomycin, monesin, rhodopsin, nonactin, monactin, ionomycin, gramicidin A, nigericin, CCCP (carbonyl cyanide-m-chlorophenylhydrazone), FCCP (carbonyl cyanide-p-trifluoromethoxyphenylhydrazone), and the like. Examples of the synthetic substance include crown ether (a group of macrocyclic polyethers), acyclic nonylphenoxypolyethanol, and the like. The ion-selective substance also may be used alone or in combination of two or more. Specific examples of the ion-selective substance include DD16C5, Bis-12Crown-4, 12-Crown-4, 15-Crown-5, 18-Crown-6, and calixarene.

The ion selective membrane usually contains a binder resin. The binder resin is not particularly limited. Polyvinyl chloride, polyvinylidene chloride, polyacrylonitrile, polyurethane, polyvinyl acetate, silicon elastomer, polyvinyl alcohol, cellulose ester, polycarbonate. Specifically, examples of the binder resin include polyvinyl chloride, polyvinylidene chloride, polyacrylonitrile, polyurethane, polyvinyl acetate, silicon elastomer, polyvinyl alcohol, cellulose ester, polycarbonate, vinyl chloride/vinyl acetate copolymer, vinyl chloride/vinyl acetate/vinyl alcohol copolymer, vinyl chloride/vinylidene chloride copolymer, and the like. The binder resin also may be used alone or in combination of two or more.

The ion selective membrane preferably contains a plasticizer. Since the plasticizer enhances the flexibility of the ion-selective membrane, for example, the occurrence of cracks in the ion-selective membrane can be suppressed. The plasticizer is not particularly limited, and may be, for example, TEHP (tris phosphate (2-ethylhexyl)), NPOE (2-nitrophenyl octyl ether), DOP (dioctyl phthalate), DOS (dioctyl sebacate), DBE (dibasic acid ester), BA (butyl acrylate) and the like. The plasticizer also may be used alone or in combination of two or more.

The ion selective membrane preferably contains an anion exclusion agent. The anion exclusion agent can be selected according to the measurement ion. Examples of the anion exclusion agent include tetrakis (4-chlorophenyl) sodium borate (Na-TCPB), tetrakis (4-chlorophenyl) potassium borate (K-TCPB), and tetrakis[3,5-bis (trifluoromethyl) phenyl] sodium borate (Na-TFPB), tetrakis[3,5-bis (trifluoromethyl) phenyl] potassium borate (K-TFPB), potassium tetraphenylborate (K-TPB), sodium tetraphenylborate (Na-TPB), and tetrakis[3,5-bis (1,1,1,3,3,3-hexafluoro-2-methoxy-2-propyl) phenyl] sodium borate. The anion exclusion agent also may be used alone or in combination of two or more.

The content of the above components is not particularly limited insofar as the ion selection membrane can function. The content of the ion-selective film with respect to 100% by mass is, for example, 3 to 10% by mass for the ion-selective substance, 15 to 45% by mass for the binder resin, 50 to 80% by mass for the plasticizer, and 1 to 5% by mass for the anion exclusion agent.

The layer structure of the ion selective membrane is not particularly limited. The ion-selective membrane may have a single-layer structure composed of one layer having a single composition, or may have a multi-layer structure consisting of a plurality of layers having the same or different compositions from each other.

The thickness of the ion selection membrane is not particularly limited. The thickness is, for example, 50 to 300 µm.

The use of the ion selective membrane is not particularly limited, and is, for example, a cation-selective membrane such as sodium ion and potassium ion.

Figure 2:
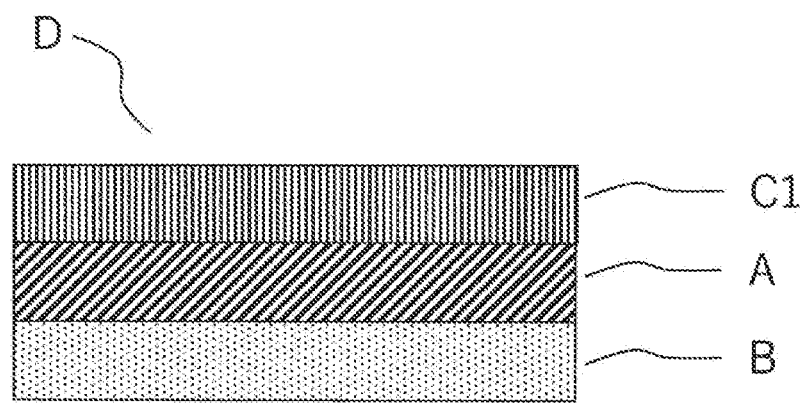
FIG. 2 is a schematic cross-section showing an example of an electrode according to one or more embodiments.

The ion selective membrane is placed on the inner solid layer. Preferably, the ion selective membrane is placed directly on the inner solid layer. An embodiment of the ion-selective electrode of the present invention is shown in FIG. 2. In the ion-selective electrode, it is preferable to arrange the internal solid layer so as to cover the side surface of the electrode material, to provide a side wall, and the like so that the electrode material is not exposed. In the ion-selective electrode, it also is preferable to arrange the ion-selective membrane so as to cover the side surface of the internal solid layer, to provide a side wall and the like so that the internal solid layer is not exposed.

When the electrode of the present invention is used as a reference electrode, the electrode of the present invention is preferably a layer capable of functioning as a salt bridge and suppressing the influence of changes in external ion concentration (referred to as "salt bridge layer" in the present specification. As such a layer, an ionic liquid gel film can be suitably adopted.

The ionic liquid is not particularly limited insofar as, for example, it is a hydrophobic ionic liquid of cations including at least one of an imidazolium cation, a pyridinium cation, a piperidinium cation, a pyrrolidinium cation, a quaternary ammonium cation, a phosphonium cation, or an arzonium cation, and anions including at least one of [R1SO2NSO2R2]- (where R1 and R2 are perfluoroalkyl groups having 1 to 5 carbon atoms, respectively), borate ions containing fluorine and tetravalent boron, and bis (2-ethylhexyl) sulfosuccinate, AlCl4-, Al3Cl7-, NO3-, BF4-, PF6-, CH3COO—, CF3COO—, CF3SO3-, (CF3SO2)2N—, or (CF3SO2)3C—, AsF6-, SbF6-, F(HF)n-, CF3CF2CF2SO3-, (CF3CF2SO2)2N—, or CF3CF2CF2COO—.

The method for gelling the hydrophobic ionic liquid is not particularly limited, but gelation can be performed using a polymer compound. Examples of such polymer compounds include vinylidene fluoride-hexafluoropropylene copolymer, polymethylmethacrylate, polyethylmethacrylate, polyacrylonitrile, polybutylacrylate, polyvinylpyridine, and organic electrolyte oligomer (the main chain cation portion having a PICPM structure, and the like), polyvinyl chloride, other synthetic rubbers. A cross-linking agent also may be used together with the polymer, for example, a gelling agent containing a cross-linking agent having a plurality of fluoroalkylated sulfonylamide groups and a polymer compound having a group capable of forming an onium salt with the cross-linking agent. A plasticizer also may be used together with the polymer, and for example, a plasticizer may be mixed with polyvinyl chloride and dried to gel. The same plasticizer as the above-mentioned plasticizer used for the ion selective membrane can be used as the plasticizer.

The layer structure of the salt bridge layer is not particularly limited. The layer may be a single-layer structure composed of one layer having a single composition, or may be a multi-layer structure composed of a plurality of layers having the same or different compositions from each other.

Figure 3:
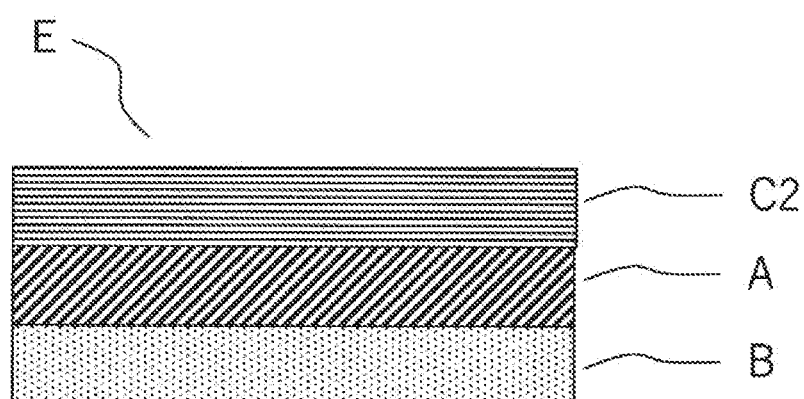
FIG. 3 is a schematic cross-section showing an example of a reference electrode according to one or more embodiments.

The salt bridge layer is placed on the inner solid layer. Preferably, the salt bridge layer is placed directly on the inner solid layer. An embodiment of the reference electrode of the present invention is shown in FIG. 3. In the reference electrode, it is preferable to arrange the internal solid layer so as to cover the side surface of the electrode material so that the electrode material is not exposed, or to provide a side wall on the side surface. In the reference electrode, it is preferable to arrange the salt bridge layer so as to cover the side surface of the internal solid layer so that the internal solid layer is not exposed, or to provide a side wall on the side surface.

The method for manufacturing the electrode of the present invention is not particularly limited. Preferably, the electrode of the present invention can be produced by a method including forming an internal solid layer containing a metal oxide and a solid electrolyte on the electrode material.

The method of forming the inner solid layer is not particularly limited. Preferably, an internal solid layer can be formed by forming a composition containing a metal oxide and a solid electrolyte on an electrode material and drying the composition. Although electrostatic coating, coating with a dispenser, screen printing, sputtering, vapor deposition and the like can be adopted, from the viewpoint of improving the adhesion between the metal oxide and the solid electrolyte, electrostatic coating is preferable as the film forming method.

As a method for forming other layers such as an ion selective membrane and a salt bridge layer, a method similar to the above can be adopted. That is, layers can be formed by forming a composition (paste, solution, and the like) containing each component constituting the layer on the inner solid layer and drying it.

2. Ion Sensor

In one aspect, the present invention is related to an ion sensor (in the present specification, "the ion sensor of the present invention") including an insulating substrate and an electrode of the present invention arranged on the insulating substrate. This will be described below.

The insulating substrate is not particularly limited insofar as it contains an insulating material that does not affect the conductivity of the electrode. Examples of the insulating material include polyester resins such as polyvinyl alcohol, polyethylene terephthalate, polybutylene terephthalate, polyethylene naphthalate, and polybutylene naphthalate; polyimide; glass epoxy resin; glass; ceramic; fiber base materials such as paper.

Figure 4:
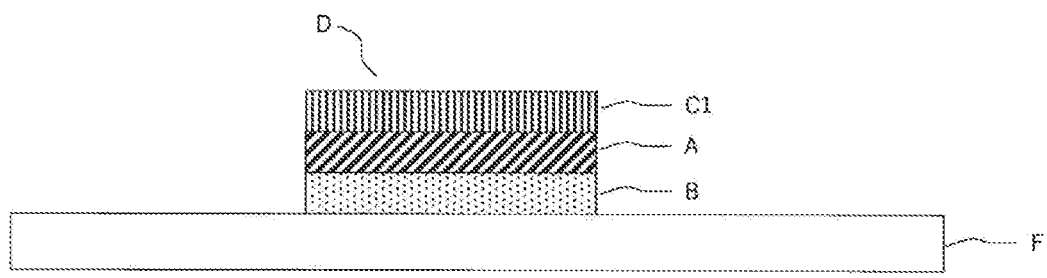
FIG. 4 is a schematic cross-section showing an example of an ion sensor according to one or more embodiments

In one aspect of the invention, the ion sensor of the invention comprises an electrode of the invention which is an ion selective electrode. A schematic cross-sectional view in this case is shown in FIG. 4.

Figure 5:
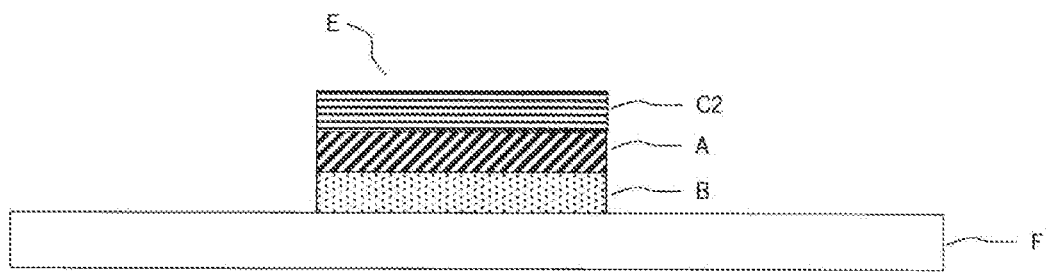
FIG. 5 is a schematic cross-section showing an example of part of an ion sensor according to one or more embodiments.

A reference electrode having an internal liquid, an all-solid-state reference electrode, or the like can be used as the reference electrode. Specifically, for example, an electrode designed to maintain a constant Cl concentration on the surface of an Ag/AgCl electrode (for example, a resin film holding a Cl ion), and the electrode of the present invention containing a salt bridge layer can be used as a reference electrode. FIG. 5 shows a schematic cross-sectional view of a part of the ion sensor of the present invention in the latter case.

Figure 6:
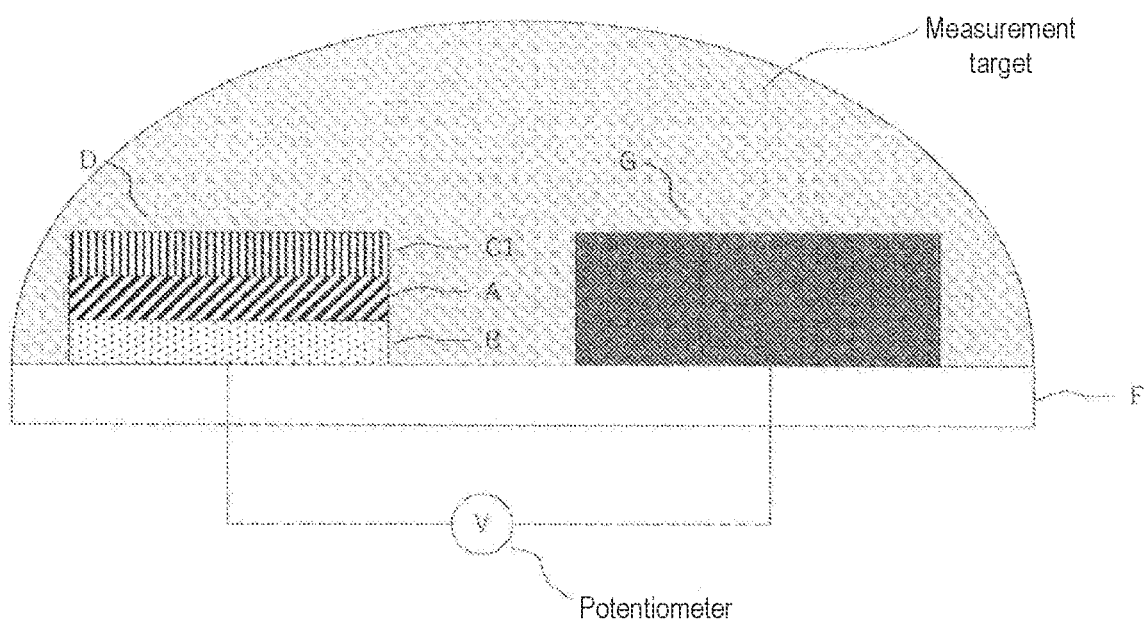
FIG. 6 is a schematic cross-section showing an example of an ion sensor according to one or more embodiments.

In one aspect of the invention, the ion sensor of the invention comprises an electrode of the invention which is an ion selective electrode. A schematic cross-sectional view in this case is shown in FIG. 6.

Figure 7:
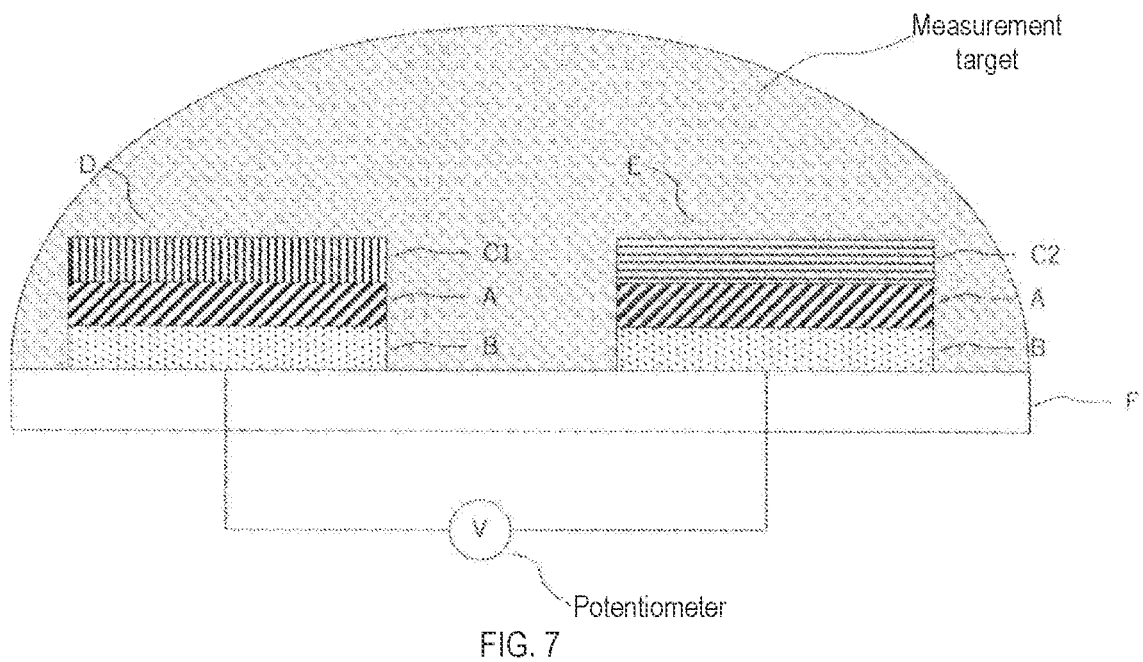
FIG. 7 is a schematic cross-section showing an example of an ion sensor according to one or more embodiments.

In one aspect, the ion sensor of the present invention includes an electrode of the present invention which is an ion selective electrode and an electrode of the present invention which is a reference electrode. A schematic cross-sectional view in this case is shown in FIG. 7.

Figure 8:
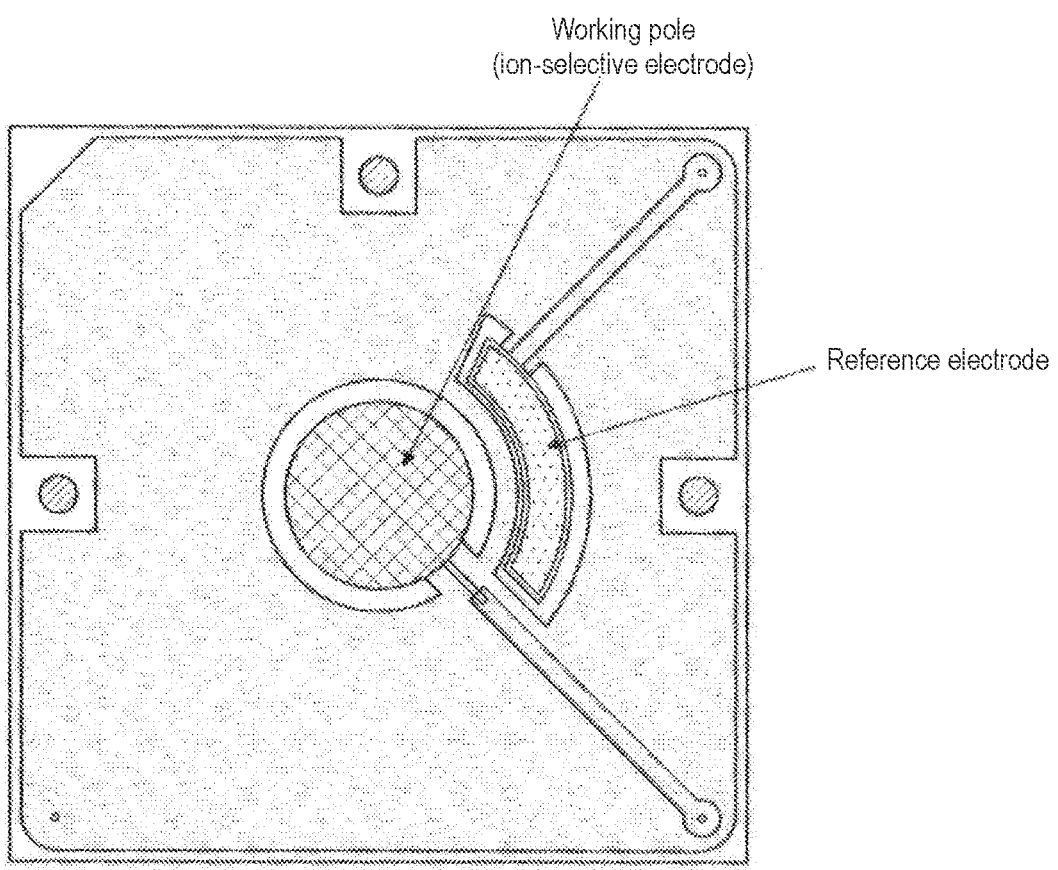
FIG. 8 is a schematic cross-section showing an example of an ion sensor according to one or more embodiments.
Figure 9A:
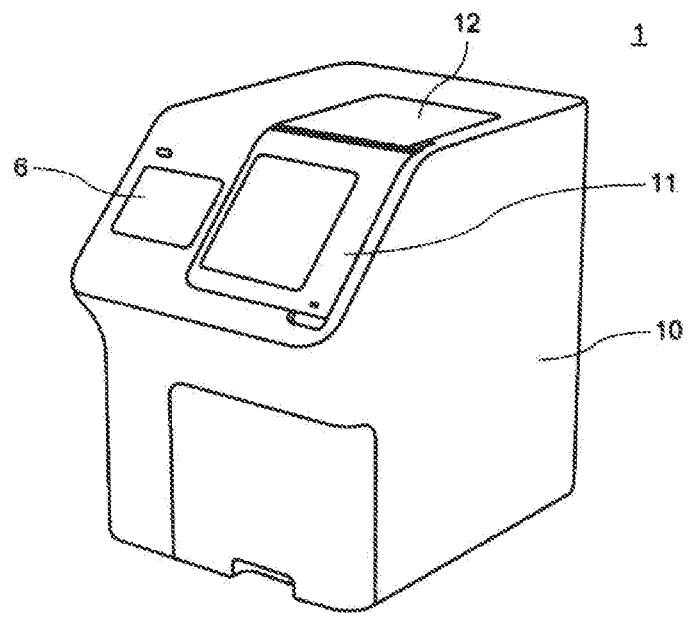
FIG. 9A is a perspective view of a first cover of the in-vivo component measuring device in a closed state.
Figure 9B:
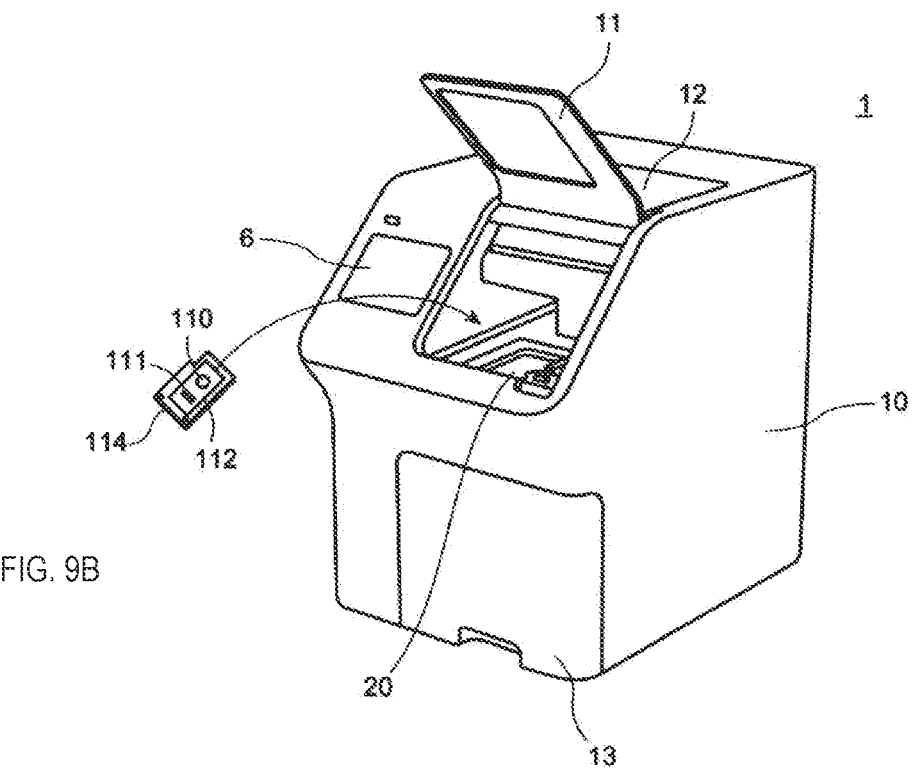
FIG. 9B is a perspective view of the first cover in the open state.

The ion sensor of the present invention includes other parts such as electrode leads, if necessary. An example of a suitable form of the ion sensor of the present invention is shown in FIG. 8.

The ion sensor of the present invention is preferably used as a sodium ion sensor.

The object to be measured (for example, tissue fluid collected from a subject, a substance holding the tissue fluid, and the like) is brought into contact with the electrode of the ion sensor of the present invention, and the potential between the ion-selective electrode and the reference electrode is measured, then the ion concentration in the measurement target can be calculated based on the obtained measured value.

3. In-Vivo Component Measuring Device

In one aspect, the present invention is an in-vivo component measuring device including the ion sensor of the present invention for measuring the sodium ion concentration contained in the tissue fluid collected from the subject (in the present invention, "the present invention" may also be referred to as "in-vivo component measuring device"). This will be described below.

The in-vivo component measuring device of the present invention is not particularly limited insofar as it includes the ion sensor of the present invention and can measure the ion concentration of sodium ions or the like in the object to be measured. The in-vivo component measuring device of the present invention preferably includes the ion sensor of the present invention, a detection unit, a control means, an operation display unit, and a power source (preferably, a glucose ion sensor and a reagent storage unit, and a liquid feeding part). Hereinafter, a preferred embodiment of the in-vivo component measuring device of the present invention will be described with reference to FIGS. 9 to 12.

The in-vivo component measuring device 1 includes an installation unit 20 in which the tissue collector 110 that collects the tissue fluid is installed, a glucose sensor 21 that acquires a signal that reflects the amount of the component to be measured contained in the tissue fluid in contact with the tissue fluid collector 110 installed in the installation unit 20, and a moving unit 60 that brings the tissue fluid collector 110 installed in the installation unit 20 into contact with the glucose sensor 21 by changing the relative position between the installation unit 20 and the glucose sensor 21 to a predetermined positional relationship. The in-vivo component measuring device 1 acquires a signal reflecting the amount of glucose contained in the tissue fluid by the glucose sensor 21, and measures the glucose concentration in the tissue fluid. In the present embodiment, the in-vivo component measuring device 1 also includes a sodium ion sensor 22 that acquires a signal reflecting the amount of electrolyte contained in the tissue fluid while in a state of contact with the tissue fluid collector 110 installed in the installation unit 20, wherein the moving unit 60 makes contact between the tissue fluid collector 110 installed in the installation unit 20 and the sodium ion sensor 22 by changing the relative position between the installation unit 20 and the sodium ion sensor 22 to a predetermined positional relationship and, by doing so, a signal reflecting the amount of sodium ions contained in the tissue fluid is acquired, and the sodium ion concentration in the tissue fluid is measured.

Figure 10A:
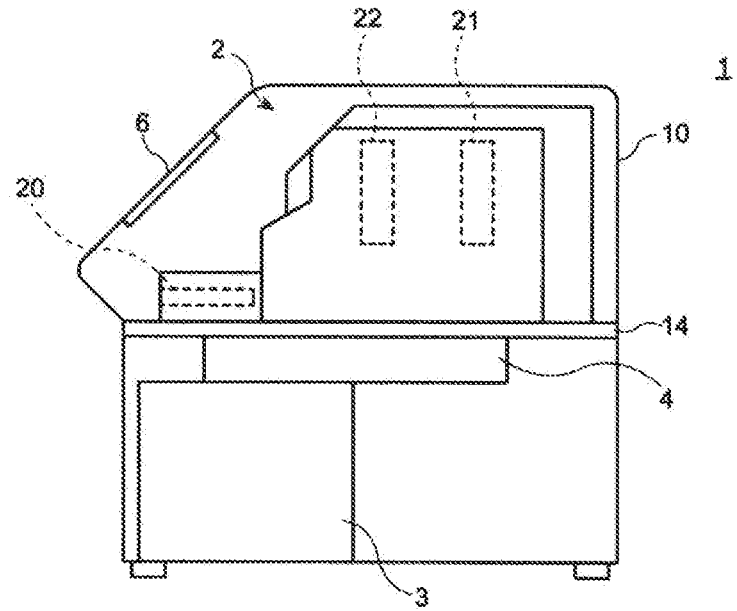
FIG. 10A is a diagram showing the structure of the inside of an in-vivo component measuring device from a side view.
Figure 10B:
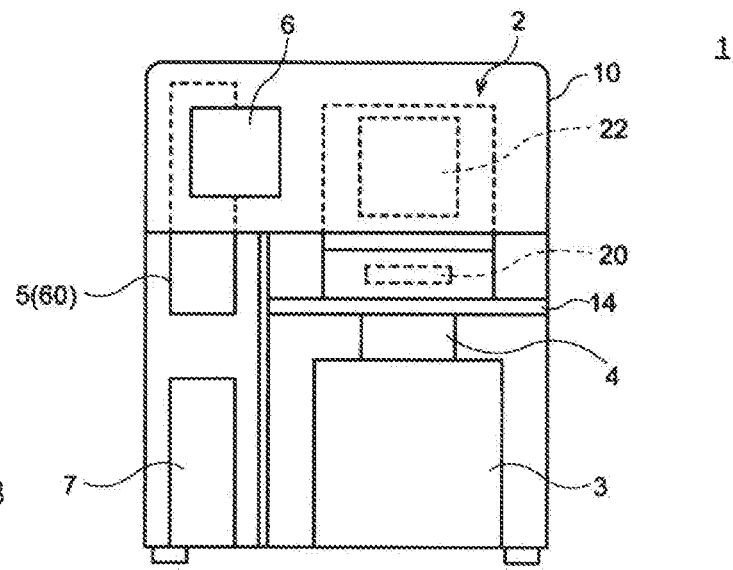
FIG. 10B shows a front view thereof.

As shown in FIGS. 9 and 10, the in-vivo component measuring device 1 includes at least a detection unit 2, a reagent storage unit 3, a liquid feeding unit 4, a control means 5, an operation display unit 6, and a power supply 7, arranged in a housing 10.

A first cover 11 is provided on the upper part of the front surface of the housing 10 at a position adjacent to the operation display unit 6. The first cover 11 is a push-open type cover, and by pushing the cover 11, the first cover 11 stands up and changes from the closed state shown in FIG. 9A to the open state shown in FIG. 9B so as to expose the installation unit 20 for installing the tissue fluid collector 110. A second cover 12 also is provided on the upper surface of the housing 10. The second cover 12 is also a push-open type cover, and although not shown, the second cover 12 stands up and changes from the closed state to the open state by pushing, and the glucose sensor 21 and the sodium ion sensor of the detection unit 22 described later are exposed thereby. A third cover 13 also is provided at the lower part of the front surface of the housing 10. When the third cover 13 is opened, various tanks of the reagent storage unit 3 are exposed.

Figure 11:
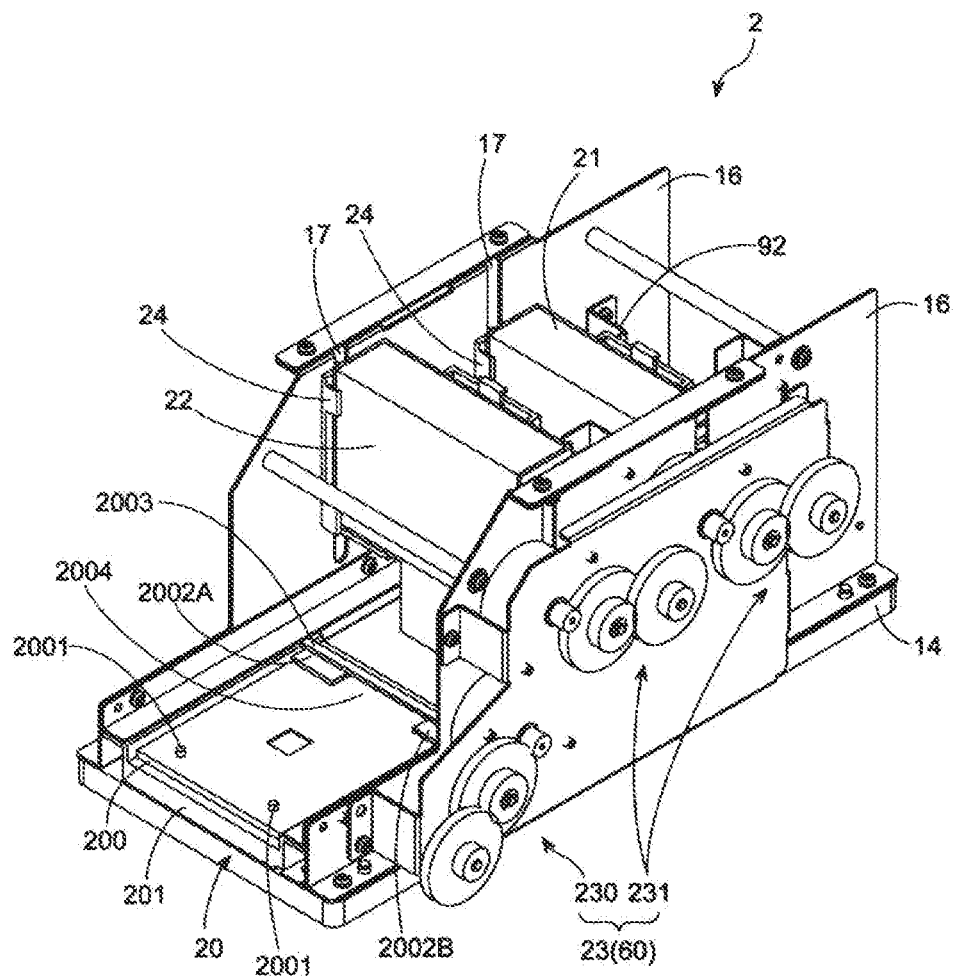
FIG. 11 is a perspective view of a detection unit.

The detection unit 2 acquires a signal relating the amount of components (glucose and electrolytes) contained in the tissue fluid collected by the tissue fluid collector 110, and a signal regarding the amount of components (electrolytes) contained in the perspiration collected by the perspiration collector 111. As shown in FIG. 11, the detection unit 2 includes an installation unit 20, a glucose sensor 21, a sodium ion sensor 22, and a drive unit 23.

The installation unit 20 is equipped with the tissue fluid collector 110 and the perspiration collector 111. The installation unit 20 includes a sample plate 200 on which a support sheet 114 supporting the tissue fluid collector 110 and the perspiration collector 111 is placed, and a sample stage 201 on which the sample plate 200 is installed.

The sample plate 200 has a rectangular shape in a plan view and has a contour slightly larger than that of the support sheet 114. The upper surface of the sample plate 200 is a flat surface, and the support sheet 114 can be stably placed on the sample plate 200. In this way the sensors 21 and 22 can be brought into good contact with the tissue fluid collector 110 and the perspiration collector 111 when the tissue fluid collector 110 and the perspiration collector 111 are measured.

Small protrusions 2001 are provided on each of the two corners on one end side of the sample plate 200 in the longitudinal direction. Both the small protrusions 2001 function as positioning parts for positioning the tissue fluid collector 110, and when the support sheet 114 is placed on the sample plate 200, the two small protrusions 2001 are fitted into the two through holes formed in the support sheet 114. In this way the support sheet 114 is placed on the sample plate 200 without being displaced, so that the tissue fluid collector 110 or the like can be positioned at an appropriate position relative to the sample plate 200. Standing walls 2002A and 2002B having a height equal to or slightly larger than the thickness of the support sheet 114 are respectively provided at the two corners on the other end side in the longitudinal direction of the upper surface of the sample plate 200. The two standing walls 2002A and 2002B are arranged so that, when the support sheet 114 is placed on the sample plate 200, one standing wall 2002A abuts on the notch 117 of the support sheet 114, and the other standing wall 2002B aligns along the side edge on the side opposite the notch 117 of the support sheet 114. In this way the support sheet 114 can be effectively positioned at an appropriate position on the sample plate 200. By holding the support sheet 114 on the sample plate 200 without misalignment in this way, the sensors 21 and 22 can be brought into good contact with the tissue fluid collector 110 and the sweat collector 111 when measuring the tissue fluid collector 110 and the perspiration collector 111.

On the other end side of the sample plate 200 in the longitudinal direction, a horizontal bar 2003 is bridged over the two standing walls 2002A and 2002B, and an insertion hole 2004 is formed between the upper surface of the sample plate 200 and a horizontal bar 2003. When the support sheet 114 is placed on the sample plate 200, the portion of the support sheet 114 on the other end side in the longitudinal direction is inserted. In this way the support sheet 114 is prevented from lifting on the sample plate 200 by the horizontal bar 2003, and can be stably placed on the sample plate 200. In this way the sensors 21 and 22 can be brought into good contact with the tissue fluid collector 110 and the perspiration collector 111 when the tissue fluid collector 110 and the perspiration collector 111 are measured.

The sample stage 201 has a rectangular shape in a plan view and has a contour slightly larger than that of the sample plate 200. The sample plate 200 is installed on the upper surface of the sample stage 201. The sample stage 201 is reciprocated in the X direction along the horizontal plane by the horizontal drive unit 230 of the drive unit 23 described later. In this way the tissue fluid collector 110 and the perspiration collector 111 are conveyed to the lower positions of the sensors 21 and 22.

Next, the glucose sensor 21 is a component detection sensor that acquires a signal reflecting the amount of glucose, which is a measurement target component contained in the tissue fluid, and functions as an acquisition unit. The sodium ion sensor 22 is a component detection sensor that acquires a signal reflecting the amount of sodium ions, which is an auxiliary component contained in the tissue fluid, and functions as a second acquisition unit.

Figure 12A:
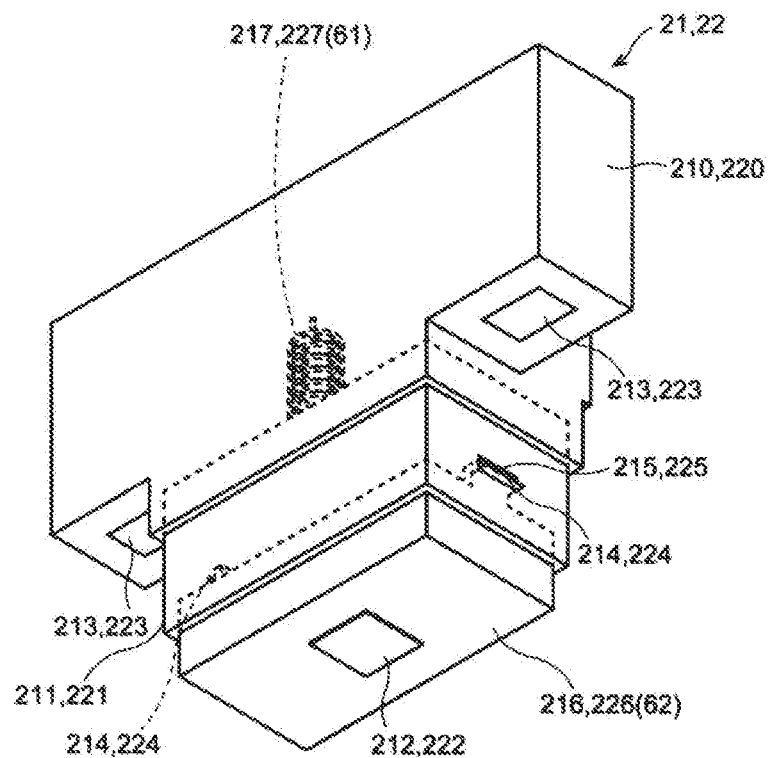
FIG. 12A is a perspective view of a glucose sensor and a sodium ion sensor.
Figure 12B:
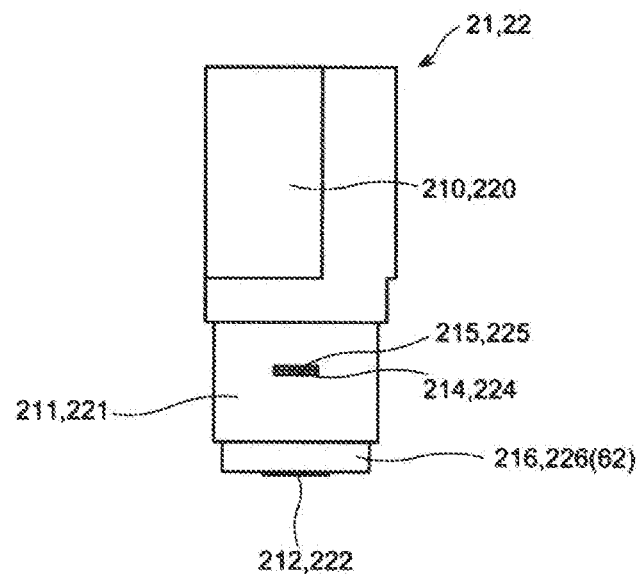
FIG. 12B is a side view thereof.

As shown in FIG. 12, each sensor 21 and 22 includes, for example, a plastic main body 210, 220, and for example, plastic slide units 211,221 which are slidably attached to the main body 210, 220, plastic cartridge units 216 and 226 detachably attached to 211 and 221, and electrodes 212 and 222 attached to the lower surfaces of the cartridge units 216 and 226.

The main bodies 210 and 220 have an upper portion and a lower portion and are shaped to have a step between the upper portion and the lower portion, and terminals 213 and 223 connected to the control means 5 are provided on the lower surface of the upper portion. An opening is formed in the lower part of the main bodies 210 and 220, and the slide units 211 and 221 protrude from this opening. Pressure absorbing members 217 and 227 are provided in the main bodies 210 and 220. The pressure absorbing members 217 and 227 may be configured by spring members such as coil springs. The pressure absorbing members 217 and 227 constitute a pressure adjusting unit 61 that constantly adjusts the contact pressure when the sensors 21 and 22 come into contact with the tissue fluid collector 110, and are included in the moving unit 60. The slide units 211 and 221 are connected to the pressure absorbing members 217 and 227, and slide up and down relative to the main bodies 210 and 220 due to the expansion and contraction of the pressure absorbing members 217 and 227. When each of the sensors 21 and 22 comes into contact with the tissue fluid collector 110 and the perspiration collector 111, the pressure absorbing members 217 and 227 expand and contract and the electrodes 212 and 222 are displaced up and down, so that the contact pressure of the electrodes 212 and 222 in contact with the tissue fluid collector 110 and the perspiration collector 111 can be adjusted to be constant. Therefore, even if the shapes of the tissue fluid collector 110 and the sweat collector 111 vary, the electrode units 212 and 222 can be brought into contact with the tissue fluid collector 110 and the perspiration collector 111 at a predetermined contact pressure. Note that the pressure absorbing members 217 and 227 connected to the slide units 211 and 221 in the main bodies 210 and 220 also may be provided in a plurality of pressure absorbing members 217 and 227 rather than one.

An opening is formed in the lower portion of the slide units 211 and 221, and the cartridge units 216 and 226 can be attached to the lower portion of the slide units 211 and 221 through the opening. Engagement holes 215 and 225 are formed on both side surfaces of the lower portion of the slide units 211 and 221.

The cartridge units 216 and 226 are consumables that are discarded when the tissue fluid collector 110 or the like is subjected to measurement a predetermined number of times. The cartridge units 216 and 226 are provided with a pair of locking claws 214 and 224 so as to correspond to the engaging holes 215 and 225 of the slide units 211 and 221. The cartridge units 216 and 226 are held by the slide units 211 and 221 by engaging the engaging claws 214 and 224 with the corresponding locking holes 215 and 225, respectively. At this time, it is preferable that the cartridge units 216 and 226 are held swingably, for example, by slightly rattling without being localized with respect to the slide units 211 and 221. The cartridge units 216 and 226 constitute an angle adjusting unit 62 that adjusts the angle at which the sensors 21 and 22 come into contact with the tissue fluid collector 110, and are included in the moving unit 60. In this way the cartridge units 216 and 226 oscillate along the surface of the tissue fluid collector 110 and the perspiration collector 111 relative to the slide units 211, 221 when each of the sensors 21 and 22 comes into contact with the tissue fluid collector 110 and the sweat collector 111 when each of the sensors 21 and 22 comes into contact with the tissue fluid collector 110 and the perspiration collector 111. Hence, the angle of the surface of the electrodes 212 and 222 in contact with the tissue fluid collector 110 and the perspiration collector 111 can be adjusted, and even if the shapes of the tissue fluid collector 110 and the perspiration collector 111 vary, the electrodes 212 and 222 can be brought into good contact with the tissue fluid collector 110 and the perspiration collector 111.

The electrodes 212 and 222 include a pair of working electrodes and counter electrodes, and a reference electrode. In the electrode 212 for measuring glucose of the glucose sensor 21, for example, the working electrode is formed of a platinum electrode with a glucose oxidase enzyme film, and the counter electrode is formed of a platinum electrode. On the other hand, in the electrode portion 222 for measuring sodium ions of the sodium ion sensor 22, for example, the working electrode is an ion-selective electrode provided with a sodium ion-selective film, and the counter electrode is a reference electrode.

The glucose sensor 21 also includes a circuit for measuring glucose (not shown) as an electric circuit connected to the electrode 212, and when the electrode 212 comes into contact with the tissue fluid collector 110, a constant voltage is applied to the tissue fluid collected by the tissue fluid collector 110, and the current at that time is acquired as a detection value. This current value depends on the glucose concentration in the tissue fluid. On the other hand, the sodium ion sensor 22 includes a circuit for measuring sodium ions (not shown) as an electric circuit connected to the electrode 222, and when the electrode unit 222 comes into contact with the tissue fluid collector 110 or the perspiration collector 111, the voltage of the tissue fluid collected in the tissue fluid collector 110 or the perspiration collected in the perspiration collector 111 is acquired as a detection value. This voltage value depends on the sodium ion concentration in the tissue fluid and perspiration. The glucose sensor 21 and the sodium ion sensor 22 are connected to the control means 5, and output the obtained current value or voltage value to the control means 5 as a detection signal. The control means 5 measures the glucose concentration and the sodium ion concentration based on the current value and the voltage value included in the detection signal and a calibration curve stored in the storage unit.

The glucose sensor 21 and the sodium ion sensor 22 are set in the detection unit 2 by being attached to the fixture 24.

The fixture 24 is attached, so as to be vertically movable, to a pair of left and right side plates 16 (shown in FIG. 11) provided on the base plate 14 of the detection unit 2. A plurality of protrusions 243 are provided on both side surfaces of the frame unit 240 in the vertical direction, and the fixture 24 moves straight in the vertical direction by sliding the elongated guide hole 17 (shown in FIG. 11) formed in the side plate 16 in the vertical direction by each protrusion 243.

Next, in the present embodiment, the drive unit 23 moves the installation unit 20 and the sensors 21 and 22 in order to bring the tissue fluid collector 110 installed in the installation unit 20 into contact with the sensors 21 and 22; this configuration is included in the moving unit 60. The drive unit 23 includes a horizontal movement drive unit 230 that moves the installation unit 20 in the horizontal direction, and a vertical movement drive unit 231 that moves the glucose sensor 21 and the sodium ion sensor 22 in the vertical direction. The vertical movement drive unit 231 is provided in the detection unit 2 corresponding to each of the glucose sensor 21 and the sodium ion sensor 22.

The installation unit 20 is conveyed between the installation position, the first measurement position, the second measurement position, and the third measurement position by the horizontal movement drive unit 230.

As a method of positioning the installation unit 20 at each measurement position, an object detection sensor such as a photo sensor is provided at each measurement position, and the object detection sensor at each measurement position is configured to detect the installation unit 20 has reached each measurement position.

The sensors 21 and 22 are conveyed between the standby position, the measurement position and the cleaning position by the vertical movement drive unit 231.

As a method of positioning each of the sensors 21 and 22 at each position, a position detection sensor attached by the frame of the attachment 24 also may be used. The position detection sensor is fixed to a sensor support plate attached to the frame unit via a fixture, and moves in the vertical direction together with the fixture 24. In this example, the detection plate 92 is fixed to one side plate 16 (shown in FIG. 11) of the detection unit 2 so as to face the position detection sensor 9. The position detection sensor detects the upper and lower ends of the detection plate 92, and the vertical movement drive unit 231 moves the sensors 21 and 22 in the vertical direction to detect the highest position (standby position) and the lowest position (cleaning).

Next, the reagent storage unit 3 includes a waste liquid tank, a first tank for storing a cleaning liquid, a second tank for storing a low-concentration calibration liquid for glucose, and a third tank for storing a high-concentration calibration liquid for glucose, a fourth tank for storing a medium-concentration calibration solution for sodium ions, and a fifth tank for storing a high-concentration calibration solution for sodium ions. The cleaning solution of the first tank is used for cleaning the glucose sensor 21 and the sodium ion sensor 22, and is also used for preparing a calibration curve for sodium ions as a low-concentration calibration solution for sodium ions. A PB-K solution is an example of the cleaning fluid. The calibration curve for glucose in the second tank and the third tank is used to prepare a glucose calibration curve. A PB-K solution to which glucose is added is an example of the calibration solution for glucose. The glucose concentration of the PB-K solution is, for example, 0.5 mg/dL at a low concentration and, for example, a concentration determined within the range of 10 mg/dL to 40 mg/dL at a high concentration. The calibration curve for sodium ions in the fourth tank and the fifth tank is used to prepare a calibration curve for sodium ions. A saline solution is an example of the calibration solution for sodium ions. The sodium ion concentration of the saline solution is, for example, a concentration determined in the range of 1 mM to 2 mM at a medium concentration, and a concentration determined within a range of, for example, 20 mM to 50 mM at a high concentration. Tris solution and PB-K solution are an example of the calibration solution for sodium. The glucose concentration or sodium ion concentration of each liquid in each tank is stored in the storage unit of the control means 5.

Next, the liquid feeding unit 4 supplies the liquid stored in each tank to the glucose sensor 21 and the sodium ion sensor 22 arranged in the detection unit 2, and collects the liquid sent to the waste liquid tank.

Next, the control means 5 controls the drive unit 23 in order to bring the tissue fluid collector 110 installed in the installation unit 20 into contact with the sensors 21 and 22, and is included in the moving unit 60. The control means 5 includes a microcomputer having a processor (for example, CPU) and a memory (for example, ROM and RAM), a circuit for processing various signals such as a user interface control board, an I/O board, and an analog board. The control means 5 controls the operation of each unit such as the detection unit 2, the liquid feeding unit 4, and the operation display unit 6 by the CPU reading and executing the program stored in the ROM. The RAM is used as a program expansion area when the program stored in the ROM is executed. The control means 5 includes a signal that reflects the amount of the measurement target component (glucose) received from the control unit that controls the drive unit 23 of the detection unit 2 and the sensors 21 and 22 of the detection unit 2, and an electrolyte (sodium) as an auxiliary component; the control means 5 functions as an analysis unit for calculating blood glucose AUC based on a signal reflecting the amount of ions, and a storage unit.

Next, the operation display unit 6 is used for instruction input to start measurement and display an analysis result and the like. The operation display unit 6 can be configured by a touch panel type display. The operation display unit 6 may be divided into an operation unit and a display unit, in which case, the operation unit may be composed of buttons, switches, a keyboard, and a mouse.

Next, the power supply 7 converts the AC power supply voltage input from the power supply plug (not shown) into a DC voltage and supplies it to the control means 5. The power source 7 is also connected to other parts and supplies electric power to each part.

EXAMPLES

Hereinafter, the present invention will be described in detail based on examples, however, the present invention is not limited to these examples.

The average particle size shown in the following test example is a value with a cumulative frequency of 50% measured by a laser diffraction/scattering type particle size distribution measuring device. The thickness of each layer was obtained by applying and drying the corresponding layer and then measuring it with a contact type step meter.

Test Examples 1

Potential Response to NaCl Concentration of Ion-Selective Electrode

Test Example 1-1

Preparation of Ion Selective Electrode (Example 1)

An ion-selective electrode (Example 1) was prepared as follows. Platinum paste was laminated on a ceramic substrate to form an electrode material with a diameter of 5 mm. On the electrode material, metal oxide (Na0.33MnO2 (rectangular crystal structure), average particle size 8.9 μm, flake-like), solid electrolyte (β "alumina: Na2Al10.6O15.9, average particle size 0.26 μm), a conductive agent (AB: acetylene black), and a binder (PVDF: polyvinylidene fluoride) were laminated by electrostatic coating to form an internal solid layer having a thickness of 10 μm. On the inner solid layer, 3 parts by mass of ionophore (DD16C5: 16-crown-5 derivative with two decalino sub-units), 68 parts by mass of plasticizer (TEHP: tris phosphate (2-ethylhexyl)), anion exclusion agent (Na)-TFPB: a paste containing 1 part by mass of tetrakis[3,5-bis (trifluoromethyl) phenyl] sodium borate) and 29 parts by mass of a base material (PVC: polyvinyl chloride) was laminated four times to form a sodium ion-selective film having a thickness of 170 to 190 μm to obtain an ion-selective electrode.

Figure 13:
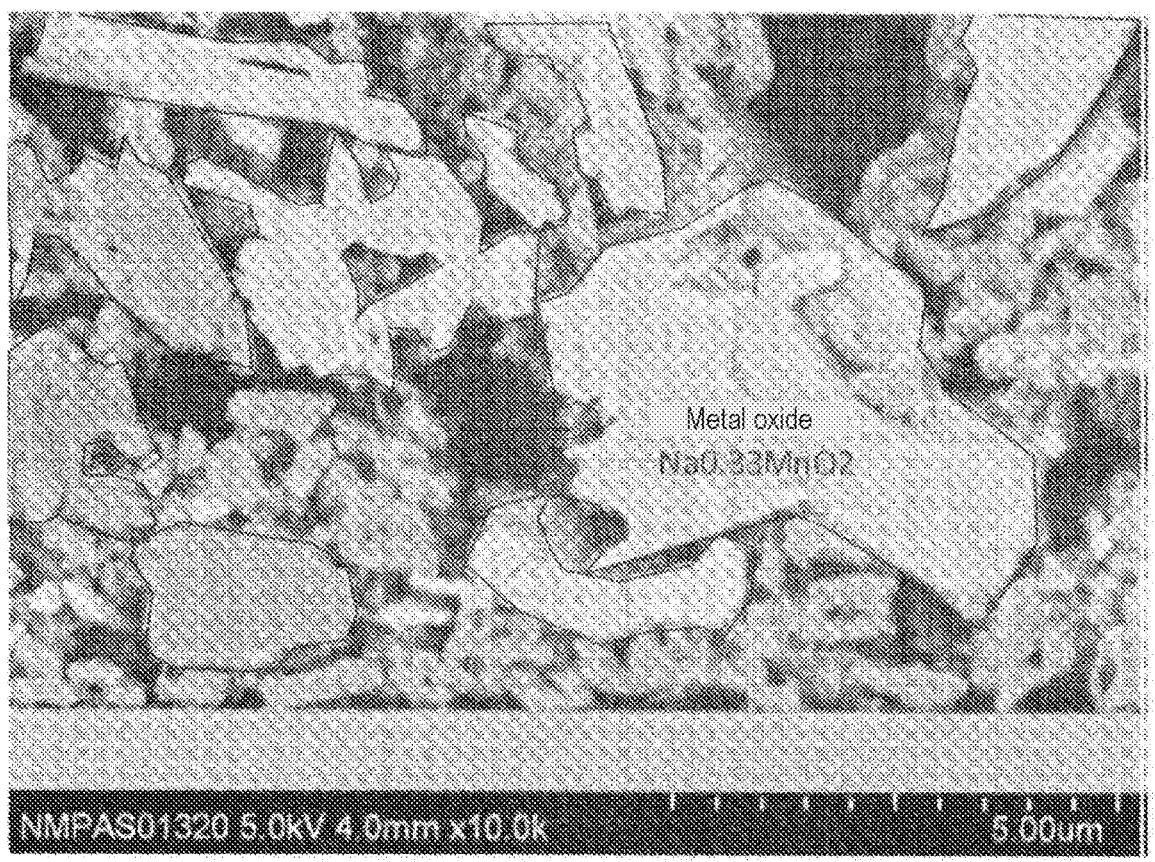
FIG. 13 shows a layout mode of each material in a cross-sectional SEM image of the internal solid layer.
Figure 14:
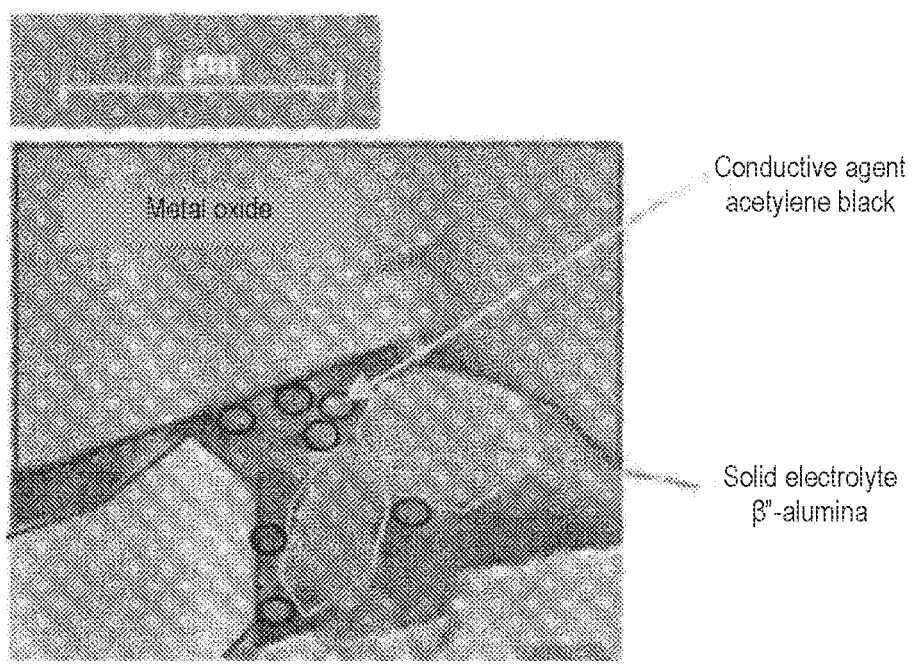
FIG. 14 shows an arrangement mode of each material in a cross-section SEM image of an internal solid layer.

The cross section of the ion-selective electrode was observed with a scanning electron microscope (SEM). The arrangement of each material in the cross section also was investigated by EDX mapping. FIGS. 13 and 14 show the arrangement mode of each material in the cross-sectional SEM image of the inner solid layer. It was found that the metal oxide particles were surrounded by solid electrolyte particles having a particle size smaller than that of the metal oxide.

The mass ratios of solid electrolytes, metal oxides, conductive agents, and binders in the inner solid layer are shown in the table below.

TABLE 1

| | Solid electrolyte β-alumina | Metal oxide $Na_{0.33}MnO_2$ | Conducive agent AB | Binder PVDF |
|---|---|---|---|---|
| Working Ex. 1 | 8 | 8 | 1 | 1 |

Test Example 1-2

Preparation of Reference Electrode

A reference electrode made of silver/silver chloride paste was formed by a screen printing method. A polyvinyl alcohol (PVA) film was laminated on a silver/silver chloride paste; the PVA membrane was impregnated with a solution having a chloride ion concentration of 282 mM to stabilize the potential, and then used for the measurement.

Test Example 1-3

Potentiometric Measurement

After connecting an ion sensor consisting of an ion-selective electrode (Example 1) and a reference electrode to a potential difference meter, the following electrolyte solution (NaCl and KCl mixed solution, Na concentration: 0.3 mM, 2 mM, or 50 mM, K concentration: 280 mM, Cl concentration: Na concentration (mM) +280 mM) was immersed and the potential was measured. After each potential measurement, the electrodes were washed with a washing solution (K-buffer phosphate, Na concentration: 0.3 mM, K concentration: 280 mM).

Test Example 1

Results

Figure 15:
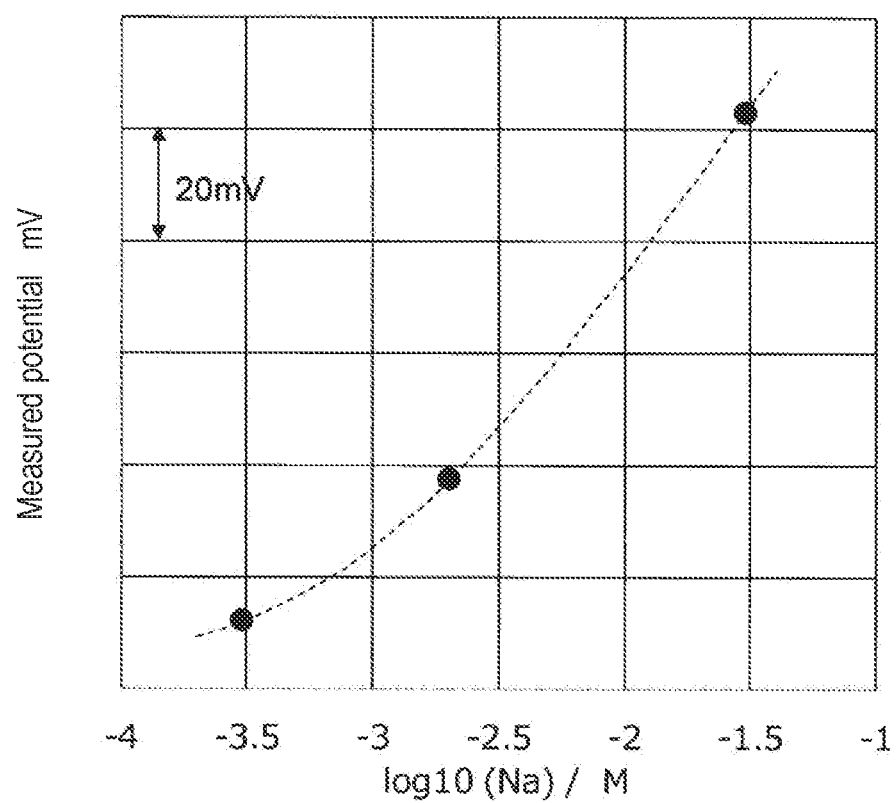
FIG. 15 shows the potential measurement result of Test Example 1; the horizontal axis shows the Na concentration of the electrolyte solution, and the vertical axis shows the measured potential.

The results are shown in FIG. 15. Ion-selective electrodes with an internal solid layer containing solid electrolytes and metal oxides have been found to respond to Na concentration.

Test Example 2

Potential Stability of Ion-Selective Electrode 1

Test Example 2-1

Preparation of Ion-Selective Electrode (Comparative Example 1)

An ion-selective electrode was obtained in the same manner as in Example 1 without using a solid electrolyte (Comparative Example 1). The table below shows the mass ratio of the internal solid layer for the ion-selective electrodes used in the potential measurements below.

TABLE 2

| | Solid electrolyte β-alumina | Metal oxide $Na_{0.33}MnO_2$ | Conductive agent AB | Binder PVDF |
|---|---|---|---|---|
| Working Ex. 1 | 8 | 8 | 1 | 1 |
| Comp. Ex. 1 | 0 | 8 | 1 | 1 |

Test Example 2-2

Potentiometric Measurement

Using ion-selective electrodes (Example 1 and Comparative Example 1), the same procedure as in Test Example 1-3 was carried out except that a 30 mM solution was used as the electrolyte solution instead of the 50 mM Na concentration solution. The measurement was repeated multiple times, and after each measurement, the electrodes were washed in the same manner as in Test Example 1-3. From each measured value, the potential fluctuation (absolute value) from the first measured potential was calculated.

Test Example 1

Results

Figure 16:
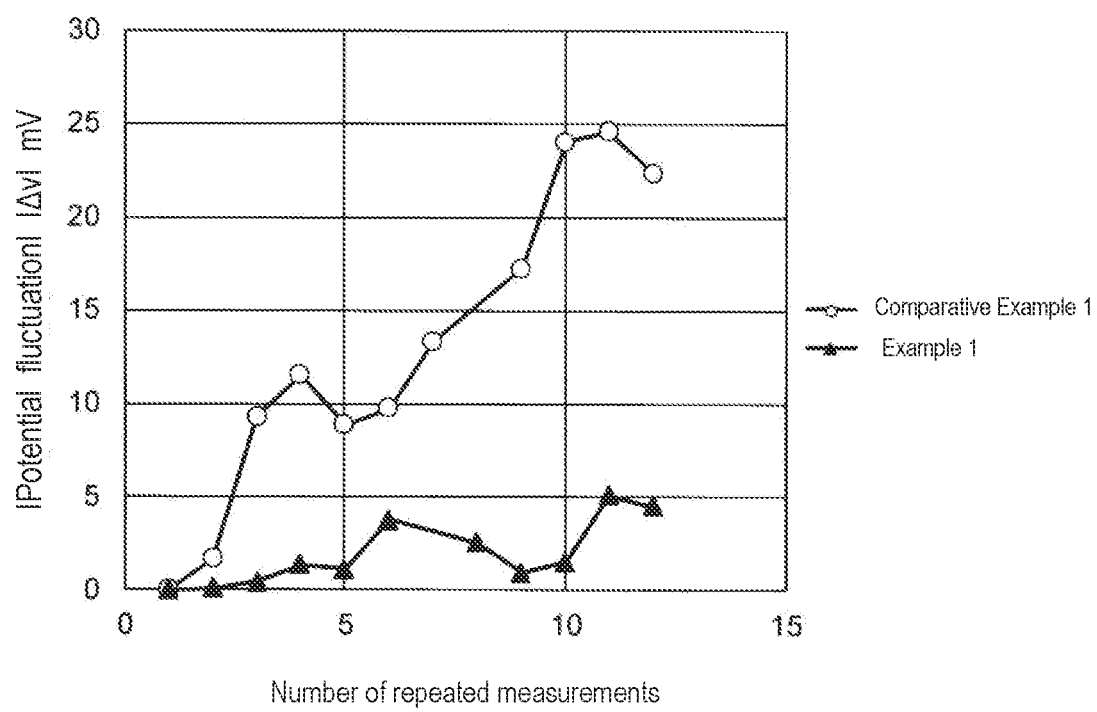
FIG. 16 shows the potential measurement result of Test Example 2; the horizontal axis shows the number of times the measurement is repeated, and the vertical axis shows the potential fluctuation (absolute value) from the first measurement potential.

The results are shown in FIG. 16. In the inner solid layer, it was found that the potential stability with respect to repeated use was improved by further adding a solid electrolyte to the metal oxide.

Test Example 3

Potential Stability of Ion-Selective Electrode 2

Test Example 3-1

Preparation of Ion Selective Electrodes (Examples 2 to 3 and Comparative Example 2

Ion-selective electrodes (Example 2: Solid electrolyte mass ratio 4, Example 3: Solid electrolyte mass ratio 12) were obtained in the same manner as in Example 1 except that the mass ratio of the solid electrolyte was changed. An ion-selective electrode (Comparative Example 2) also was obtained in the same manner as in Example 1 except that no metal oxide was used. The table below shows the mass ratio of the internal solid layer for the ion-selective electrodes used in the potential measurements below.

TABLE 3

|  | Solid electrolyte β-alumina | Metal oxide $Na_{0.33}MnO_2$ | Conductive agent AB | Binder PVDF |
|---|---|---|---|---|
| Working Ex. 1 | 8 | 8 | 1 | 1 |
| Working Ex. 2 | 4 | 8 | 1 | 1 |
| Working Ex. 3 | 12 | 8 | 1 | 1 |
| Comp. Ex. 1 | 0 | 8 | 1 | 1 |
| Comp. Ex. 2 | 8 | 0 | 1 | 1 |

Test Example 3-2

Potentiometric Measurement

Using ion-selective electrodes (Examples 1 to 3 and Comparative Examples 1 and 2), the procedure was carried out according to Test Example 1-3 except that a Na concentration 2 mM solution and a 30 mM solution were used as the electrolyte solution. In this test, three sets were carried out in succession, with one set in which the Na concentration 2 mM solution was measured 6 times, the 30 mM solution was measured once, and the 2 mM solution was measured once. In each set, the sixth potential of the 2 mM solution at which the potential became stable was measured, and the standard deviations of the three sets of the potential were calculated.

Test Example 3

Results

Figure 17:
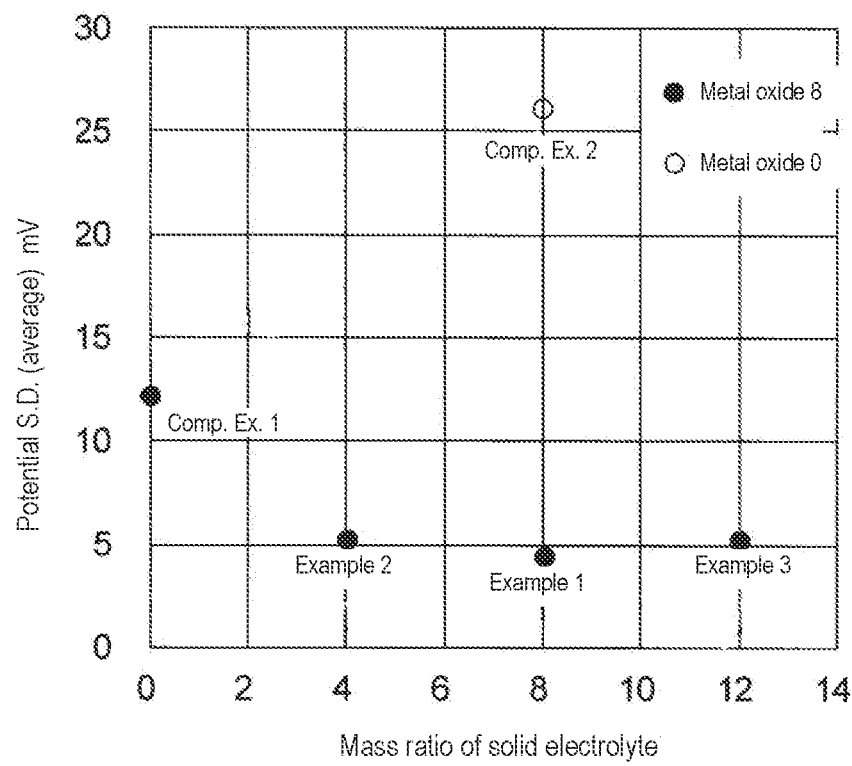
FIG. 17 shows the potential measurement result of Test Example 3; the horizontal axis shows the mass ratio of the solid electrolyte; the vertical axis shows measurements of Na concentration 2 mM solution 6 times, 30 mM solution once, and 2 mM solution once as one set, and 3 sets are continuously performed; and shows the standard deviations of three sets of the potential when the potential of the 2 mM solution at which the potential becomes stable are measured six times.

The results are shown in FIG. 17. In the inner solid layer, it was found that the potential stability with respect to repeated use was improved by further adding a solid electrolyte to the metal oxide. It also was found that the potential fluctuation was large when the solid electrolyte was added but the metal oxide was not added. From this, it was found that the combination of the metal oxide and the solid electrolyte is important for the potential stability against repeated use.

Test Example 4

Potential Stability of Ion-Selective Electrode 3

Test Example 4-1

Preparation of Ion-Selective Electrode (Example 4)

An ion-selective electrode (Example 4) was obtained in the same manner as in Example 1 except that β-alumina (Na2O-11Al2O3, average particle size 0.26 μm) was used as the solid electrolyte. The table below shows the mass ratio of the internal solid layer for the ion-selective electrodes used in the potential measurements below.

TABLE 4

|  | Solid electrolyte | | Metal oxide | Conducive agent | Binder |
|---|---|---|---|---|---|
|  | β" | β | $Na_{0.33}MnO_2$ | AB | PVDF |
| Working Ex. 1 | 8 | 0 | 8 | 1 | 1 |
| Working Ex. 4 | 0 | 8 | 8 | 1 | 1 |

Test Example 4-2

Potentiometric Measurement

Using ion-selective electrodes (Examples 1 and 4), this was performed according to Test Examples 1-3. In this test, measurements were repeated throughout the day, and this was performed for 3 days. Based on the measured values, the difference (absolute value) in the measured potentials of the electrolyte solutions of the same concentration obtained at the beginning and the end of each day was calculated, and the average value was calculated.

Test Example 4

Results

Figure 18:
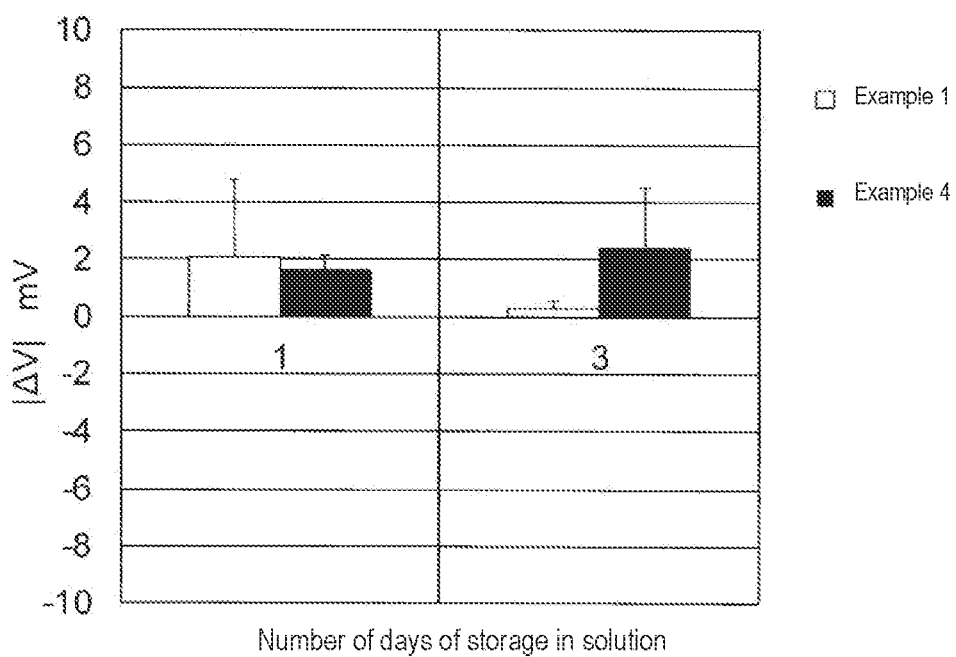
FIG. 18 shows the potential measurement result of Test Example 4; on the horizontal axis, "1" indicates the result of the first day, and "3" indicates the result of the third day; the vertical axis shows the difference (absolute value) in the measured potentials of the electrolyte solutions of the same concentration obtained at the beginning and the end on each day.

The results are shown in FIG. 18. It was found that high potential stability can be obtained with repeated use regardless of whether β"-alumina or β-alumina is used as the solid electrolyte.

Test Example 5

Potential Stability of Reference Electrode 1

Test Example 5-1

Preparation of Electrode for Reference Electrode (Example 5)

The electrode (Example 5) was prepared as follows. Platinum paste was laminated on a ceramic substrate to form an electrode material with a diameter of 5 mm. On the electrode material, metal oxide (Na0.33MnO2 (rectangular crystal structure), average particle size 8.9 μm, flake-like), solid electrolyte (β" alumina: Na2Al10.6O15.9, average particle size 0.26 μm), a conductive agent (AB: acetylene black), and a binder (PVDF: polyvinylidene fluoride) were laminated by electrostatic coating to form an internal solid layer having a thickness of 10 μm. An ionic liquid gel film was formed on the inner solid layer as follows. Specifically, an electrode was obtained by mixing PVDF-HFP (ARKEMA, Kynar Flex 2751-00 (HFP 15 mol %)) and acetone at 1:10 (wt) and stirred overnight, and then adding the ionic liquid PP13-TFSI (1-Methyl-1-propylpyrrolidinium bis (trifluoromethanesulfonyl) imide manufactured by Tokyo Kasei Kogyo Co., Ltd. so that PVDF-HFP:PP13-TFSI was 2:8, and applying the obtained solution onto the internal solid layer, laminating 10 times while drying at 50°

C., and finally drying at 150° C. to form an ionic liquid gel film. The mass ratios in the inner solid layer are shown in the table below.

TABLE 5

| | Solid electrolyte β-alumina | Metal oxide $Na_{0.33}MnO_2$ | Conductive agent AB | Binder PVDF |
|---|---|---|---|---|
| Working Ex. 5 | 8 | 8 | 1 | 1 |

Test Example 5-2

Potentiometric Measurement

Figure 19:
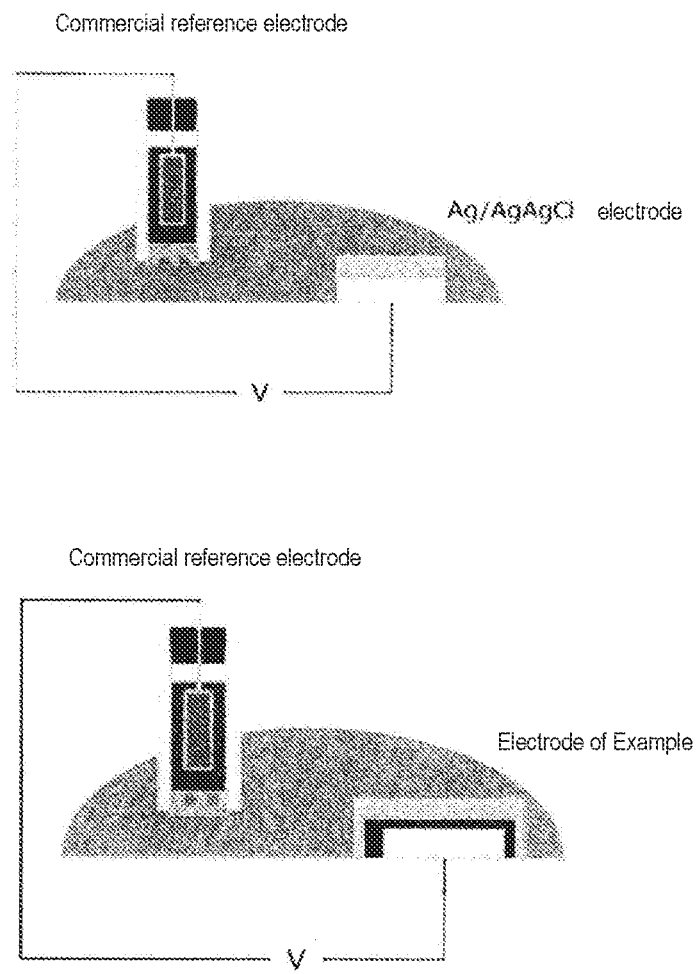
FIG. 19 is a schematic diagram showing an outline of the potential measurement method of Test Example 5.

Using an electrode (Example 5) or an electrode formed from silver/silver chloride paste (Comparative Example 3) instead of the ion-selective electrode, and using a solution having a Na concentration of 0.3, 1, 2, 10, and 30 mM as an electrolyte solution, the same procedure as in Test Examples 1-3 was carried out except that an Ag/AgCl (internal solution: saturated KCl) electrode having a commercially available internal solution was used as the reference electrode. The outline of the measurement method is shown in FIG. 19.

Results of Test Example 5

Figure 20:
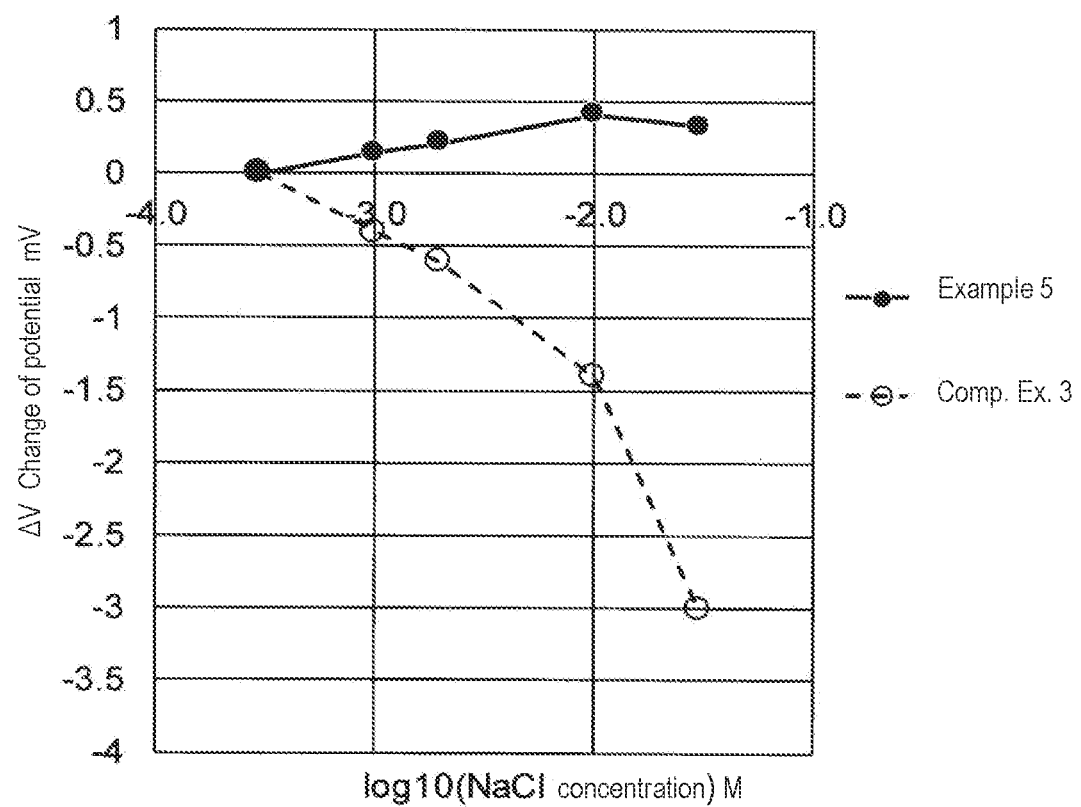
FIG. 20 shows the potential measurement result of Test Example 5; the horizontal axis shows the Na concentration of the electrolyte solution, and the vertical axis shows the potential difference from the measured potential with a Na concentration of 0.3 mM.
Figure 21:
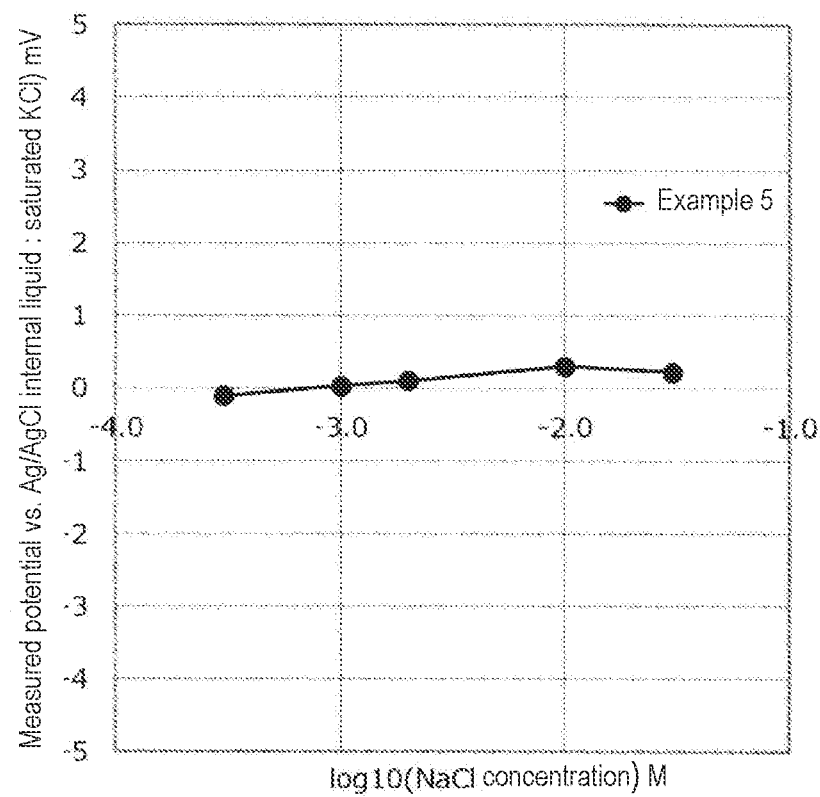
FIG. 21 shows the measurement potential of Example 5 for an Ag/AgCl (internal liquid: saturated KCl) electrode having a commercially available internal liquid in Test Example 5.

FIG. 20 shows the results of calculating the potential difference from the measured potential of Na concentration of 0.3 mM for the measured potential of each electrolyte solution. Comparative Example 3 responds to the Cl concentration because it is an Ag/AgCl electrode having no internal liquid, whereas Example 5 gave results that did not respond to Na and Cl concentrations, and It was found that an electrode that does not respond to Na concentration and Cl concentration can be obtained by forming an ionic liquid gel film on the inner solid layer containing the solid electrolyte and metal oxide. FIG. 21 also shows the measurement potential of Example 5 for an Ag/AgCl (internal liquid: saturated KCl) electrode having a commercially available internal liquid. Even when the solution in which the Na concentration and the Cl concentration are changed is measured, the potential difference between the commercially available reference electrode having the internal liquid and Example 5 electrode is near 0, and it can be seen that the potential difference is the same as that of the commercially available reference electrode having the internal liquid. Therefore, this electrode can be used as a reference electrode.

Test Example 6

Potential Stability of Reference Electrode 2

Test Example 6-1

Preparation of Electrode for Reference Electrode (Example 6 and Comparative Example 4)

An electrode (Example 6) was obtained in the same manner as in Example 5 except that β-alumina (Na2O-11Al2O3, average particle size 0.26 μm) was used as the solid electrolyte. An electrode (Comparative Example 4) was obtained in the same manner as in Example 5 except that a solid electrolyte was not used. The table below shows the mass ratio of the internal solid layer for the electrodes used in the potential measurements below.

TABLE 6

| | Solid electrolyte | | Metal oxide | Conductive agent | Binder |
|---|---|---|---|---|---|
| | β" | β | $Na_{0.33}MnO_2$ | AB | PVDF |
| Working Ex. 5 | 8 | 0 | 8 | 1 | 1 |
| Working Ex. 6 | 0 | 8 | 8 | 1 | 1 |
| Working Ex. 4 | 0 | 0 | 8 | 1 | 1 |

Test Example 6-2

Potentiometric Measurement

An electrode (Examples 5 to 6 and Comparative Example 4) is used instead of the ion-selective electrode, a solution having a Na concentration of 2 mM and a K concentration of 268 mM is used as the electrolyte solution, and Ag/AgCl electrode having a commercially available internal solution is used as the reference electrode; in other respects the procedure was identical the Test Examples 1 to 3. In this test, each electrode was immersed in an electrolyte solution for one and a half hours, and the measured potentials immediately after the immersion and one and a half hours later were measured, and the difference between the two was calculated.

Test Example 6

Results

Figure 22:
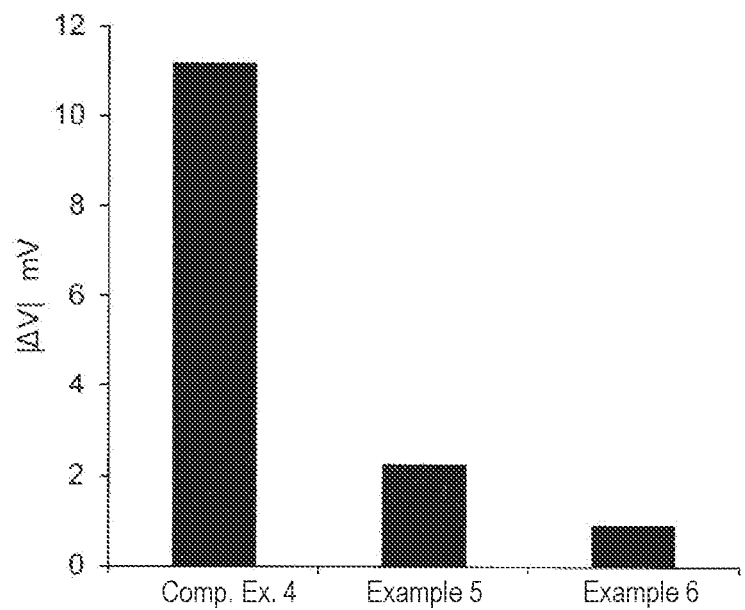
FIG. 22 shows the potential measurement result of Test Example 6; the vertical axis shows the difference between the measured potential immediately after immersion in the electrolyte solution for one and a half hours and after one and a half hours.

The results are shown in FIG. 22. In the inner solid layer, it was found that the potential stability with respect to long-term use is improved by further adding a solid electrolyte to the metal oxide.

Test Example 7

Potential Stability of Na Ion-Selective Electrode 3

Test Example 7-1

Preparation of Na Ion-Selective Electrodes (Example 7 and Example 7')

A Na ion-selective electrode (Example 7) was obtained in the same manner as in Example 1 except that the anion exclusion agent was changed to K-TCPB. A Na ion-selective electrode was obtained in the same manner as in Example 1 except that the solid electrolyte was changed to zeolite (Zeolam A-4 100 # Tosoh, average particle size after processing 3 μm) (Example 7'). For the electrodes used in the potential measurements below, the mass ratio of the internal solid layer and the anion exclusion agent in the Na ion selective membrane are shown in the table below.

TABLE 7

| | Internal solid layer | | | | Na ion-selective layer |
|---|---|---|---|---|---|
| | Solid electrolyte | | Metal oxide | Conductive agent | Binder | Anion exclusion |
| | β-alumina | Zeolite | $Na_{0.33}MnO_2$ | AB | PVDF | agent |
| Working Ex. 1 | 8 | 0 | 8 | 1 | 1 | Na-TFPB |
| Working Ex. 7 | 8 | 0 | 8 | 1 | 1 | K-TCPB |
| Working Ex. 7' | 0 | 8 | 8 | 1 | 1 | Na-TFPB |

Test Example 7-2

Potentiometric Measurement

Using ion-selective electrodes (Example 1, Example 7 and Example 7'), the procedure was carried out according to Test Examples 1-3 except that a Na concentration of 30 mM solution was used as the electrolyte solution. In this test, 11 sets were continuously carried out, with a set of measuring Na concentration 2 mM solution twice, 0.3 mM solution once, 2 mM solution once, and 30 mM solution as one set. The standard deviation of the potential of the 30 mM solution measured in each set was calculated. The standard deviations of 3 sets of the potentials were calculated, and the average of 3 sensors was calculated (in Example 7' for 1 sensor only).

Figure 23:
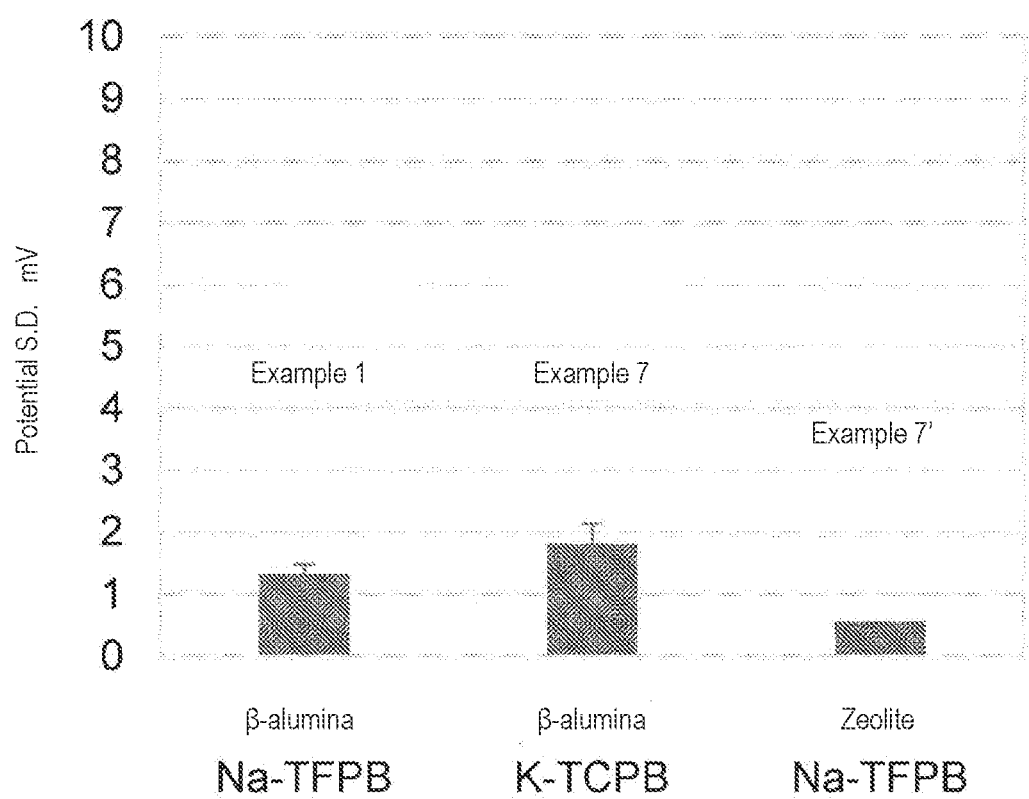
FIG. 23 shows the potential measurement result of Test Example 7; the vertical axis shows the standard deviation of the potential of the 30 mM solution.

Test Example 7 Results The results are shown in FIG. 23. It was clear that the potential was stable regardless of the type of ion in the selective membrane and regardless of the type of solid electrolyte.

Test Example 8

K Ion Concentration Responsiveness of K Ion-Selective Electrode 1

Test Example 8-1

Preparation of Na Ion-Selective Electrode (Example 8)

A K ion-selective electrode (Example 8) was prepared as follows. Platinum paste was laminated on a ceramic substrate to form an electrode material with a diameter of 5 mm. On the electrode material, metal oxide (Na0.33MnO2 (rectangular crystal structure), average particle size 7.3 μm, flake-like), solid electrolyte (β"-alumina: Na2Al10.6O15.9, average particle size 0.99 μm), a conductive agent (AB: acetylene black), and a binder (PVDF: polyvinylidene fluoride) were laminated by electrostatic coating to form an internal solid layer having a thickness of 10 μm. On the inner solid layer, 7 parts by mass of ionophore (valinomycin), 65 parts by mass of plasticizer (TEHP: tris phosphate (2-ethylhexyl)), anion exclusion agent (K-TCPB: tetrakis (4-chlorophenyl) boric acid) Potassium)) 1 part by mass, and 27 parts by mass of substrate (PVC: polyvinyl chloride) are laminated four times to form a K ion-selective film with a thickness of 170 to 190 μm, to obtain a K ion-selective electrode.

Test Example 8-2

Potentiometric Measurement

Potential was measured for Ag/AgCl and converted from the solution concentration to the potential for Ag/AgCl (saturated KCl). NaCl 140 mM K concentrations of 1, 2, 4, 6, 8, 10, 100 mM were measured in a constant solution.

Test Example 8

Results

Figure 24:
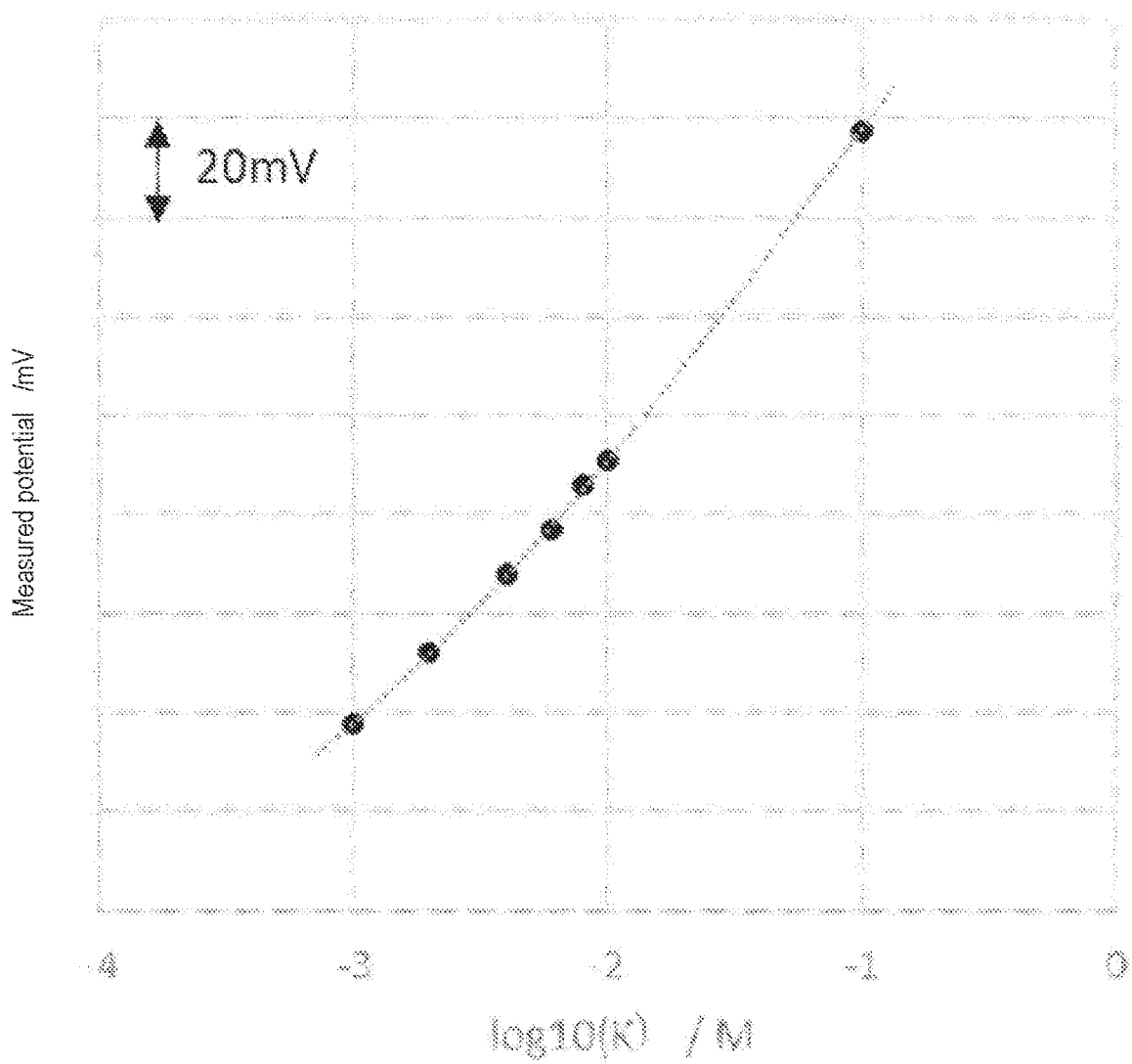
FIG. 24 shows the potential measurement result of Test Example 8; the horizontal axis shows the K concentration of the electrolyte solution, and the vertical axis shows the measured potential.

The results are shown in FIG. 24. It was found that the K ion concentration can also be measured by adopting the K ion-selective membrane.

Test Example 8'

Potential Stability of K Ion-Selective Electrode 1

Test Example 8'-1

Preparation of K Ion-Selective Electrodes (Examples 9 to 10 and Comparative Example 5)

A K ion-selective electrode (Example 9: mass ratio of solid electrolyte 2.8, Example 10: mass ratio of solid electrolyte 1.2) was obtained in the same manner as in Example 8 except that the mass ratio of the solid electrolyte was changed. A K ion-selective electrode (Comparative Example 5) also was obtained in the same manner as in Example 8 except that a solid electrolyte was not used. For the ion-selective electrodes used in the potential measurements below, the mass ratio of the internal solid layer and the anion-eliminating agent in the K ion-selective membrane are shown in the table below.

TABLE 8

| | Internal solid layer | | | | K ion-selective layer |
|---|---|---|---|---|---|
| | Solid electrolyte β-alumina | Metal oxide $Na_{0.33}MnO_2$ | Conductive agent AB | Binder PVDF | Anion exclusion agent |
| Working Ex. 8 | 8 | 8 | 1 | 1 | K-TCPB |
| Working Ex. 9 | 2.8 | 8 | 1 | 1 | K-TCPB |

TABLE 8-continued

|  | Internal solid layer | | | | K ion-selective layer |
|---|---|---|---|---|---|
|  | Solid electrolyte β-alumina | Metal oxide Na$_{0.33}$MnO$_2$ | Conductive agent AB | Binder PVDF | Anion exclusion agent |
| Working Ex. 10 | 1.2 | 8 | 1 | 1 | K-TCPB |
| Comp. Ex. 5 | 0 | 8 | 1 | 1 | K-TCPB |

Test Example 8'-2

Potentiometric Measurement

Figure 25:
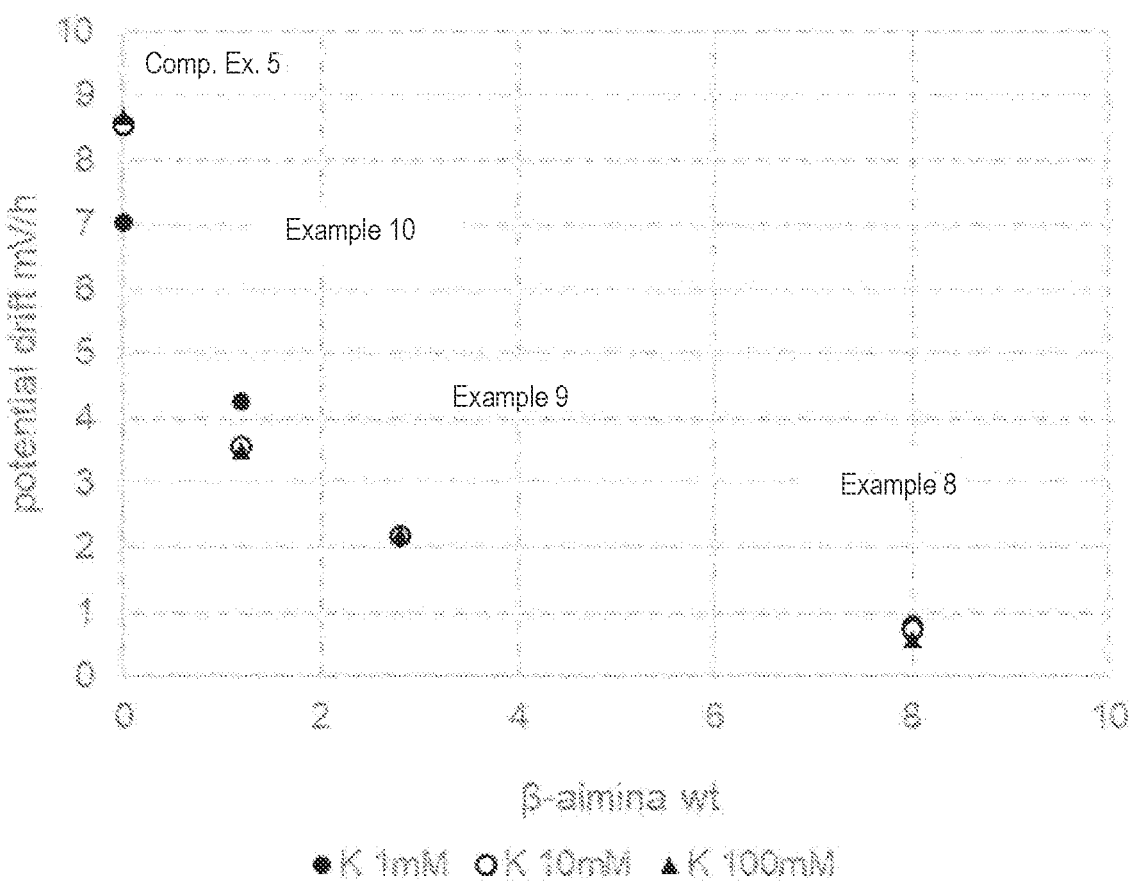
FIG. 25 shows the potential measurement result of Test Example 8'; the vertical axis shows the potential volatility of the first measured K1,10,100 mM solution and the last measured K1,10,100 mM solution after 4.8 to 5 hours.

After measuring the solution of K 1, 10, 100 mM with a constant NaCl 140 mM concentration, the solution of K 1, 2, 4, 6, 8, 10 mM with a constant NaCl 140 mM concentration were measured as one set, repeated for 6 sets of this as one set, and finally a solution of K 1, 10, 100 mM was measured at a constant concentration of NaCl 140 mM. The sensor was washed with the cleaning solution Na140 mM for each measurement. FIG. 25 shows the potential fluctuation rates of the first measured K 1, 10, 100 mM solution and the last measured K 1, 10, 100 mM solution after 4.8 to 5 hours.

Test Example 8'

Results

The results are shown in FIG. 25. The larger the amount of β-alumina added, the higher the potential stability.

Test Example 9

Potential Stability of K Ion-Selective Electrode 2

Test Example 9-1

Preparation of K Ion-Selective Electrode (Examples 11 to 13)

K ion-selective electrode was prepared in the same manner as in Example 8 except that the solid electrolyte was changed to zeolite (Zeolam A-4 100 # East Saw, average particle size after processing 3 μm) (Example 11: mass ratio of solid electrolyte 8, Example 12: mass ratio of solid electrolyte 2.8, Example 13: mass ratio of solid electrolyte 1.2). For the ion-selective electrodes used in the potential measurements below, the mass ratio of the internal solid layer and the anion-eliminating agent in the K ion-selective membrane are shown in the table below.

TABLE 9

|  | Internal solid layer | | | | K ion-selective layer |
|---|---|---|---|---|---|
|  | Solid electrolyte Zeolite | Metal oxide Na$_{0.33}$MnO$_2$ | Conductive agent AB | Binder PVDF | Anion exclusion agent |
| Working Ex. 11 | 8 | 8 | 1 | 1 | K-TCPB |
| Working Ex. 12 | 2.8 | 8 | 1 | 1 | K-TCPB |
| Working Ex. 13 | 1.2 | 8 | 1 | 1 | K-TCPB |
| Comp. Ex. 5 | 0 | 8 | 1 | 1 | K-TCPB |

Test Example 9-2

Potentiometric Measurement

The procedure was the same as in Test Example 8'-2.

Test Example 9

Results

Figure 26:
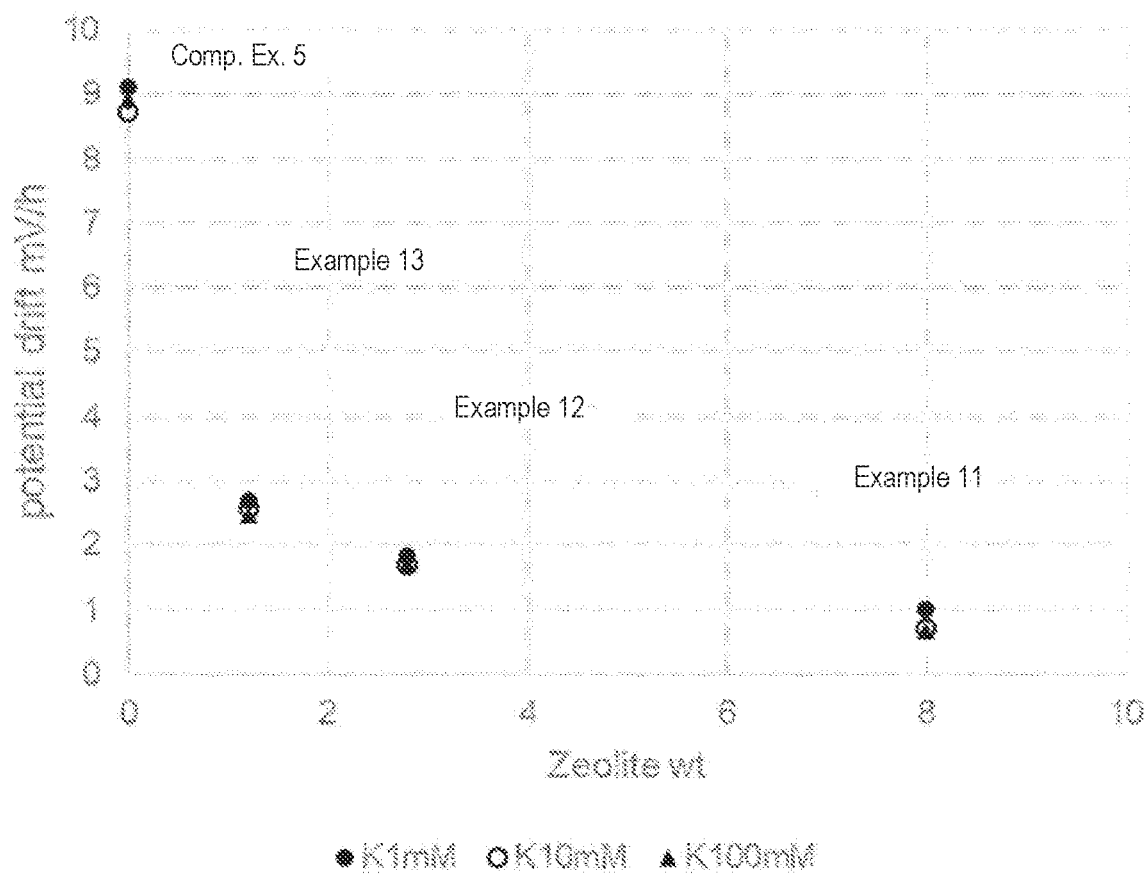
FIG. 26 shows the potential measurement result of Test Example 9; the vertical axis shows the potential volatility of the first measured K1,10,100 mM solution and the last measured K1,10,100 mM solution after 4.8 to 5 hours.

The results are shown in FIG. 26. The larger the amount of zeolite added, the higher the potential stability.

Test Example 10

Potential Stability of K Ion-Selective Electrode 3

Test Example 10-1

Preparation of K Ion-Selective Electrodes (Example 14 and Comparative Example 6)

A K ion-selective electrode was obtained in the same manner as in Example 8 except that the anion exclusion agent was changed to Na-TFPB (Example 14). Instead of using the solid electrolyte of Example 8, Na2CO3, which is a non-solid electrolyte, was used to obtain a K ion-selective electrode (Comparative Example 6). For the ion-selective electrodes used in the potential measurements below, the mass ratio of the internal solid layer and the anion-eliminating agent in the K ion-selective membrane are shown in the table below.

TABLE 10

|  | Internal solid layer | | | | | | K ion-selective layer |
|---|---|---|---|---|---|---|---|
|  | Solid electrolyte | | Non-solid electrolyte $Na_2CO_3$ | Metal oxide layer $Na_{0.33}MnO_2$ | Conductive agent AB | Binder PVDF | Anion exclusion agent |
|  | β-alumina | Zeolite A4 | | | | | |
| Working Ex. 8 | 8 | 0 | 0 | 8 | 1 | 1 | K-TCPB |
| Working Ex. 14 | 8 | 0 | 0 | 8 | 1 | 1 | Na-TFPB |
| Working Ex. 11 | 0 | 8 | 0 | 8 | 1 | 1 | K-TCPB |
| Comp. Ex. 5 | 0 | 0 | 0 | 8 | 1 | 1 | K-TCPB |
| Comp. Ex. 6 | 0 | 0 | 8 | 8 | 1 | 1 | K-TCPB |

Test Example 10-2

Potentiometric Measurement

A K ion-selective electrode (Examples 8, 11 and 14, Comparative Examples 5 and 6) was used in accordance with Test Example 8'. During the one-day measurement, the standard deviation of the potential of the K 10 mM solution measured 8 times in total was calculated, and the average for 3 sensors was calculated (1 sensor only in Example 11).

Test Example 10

Results

Figure 27:
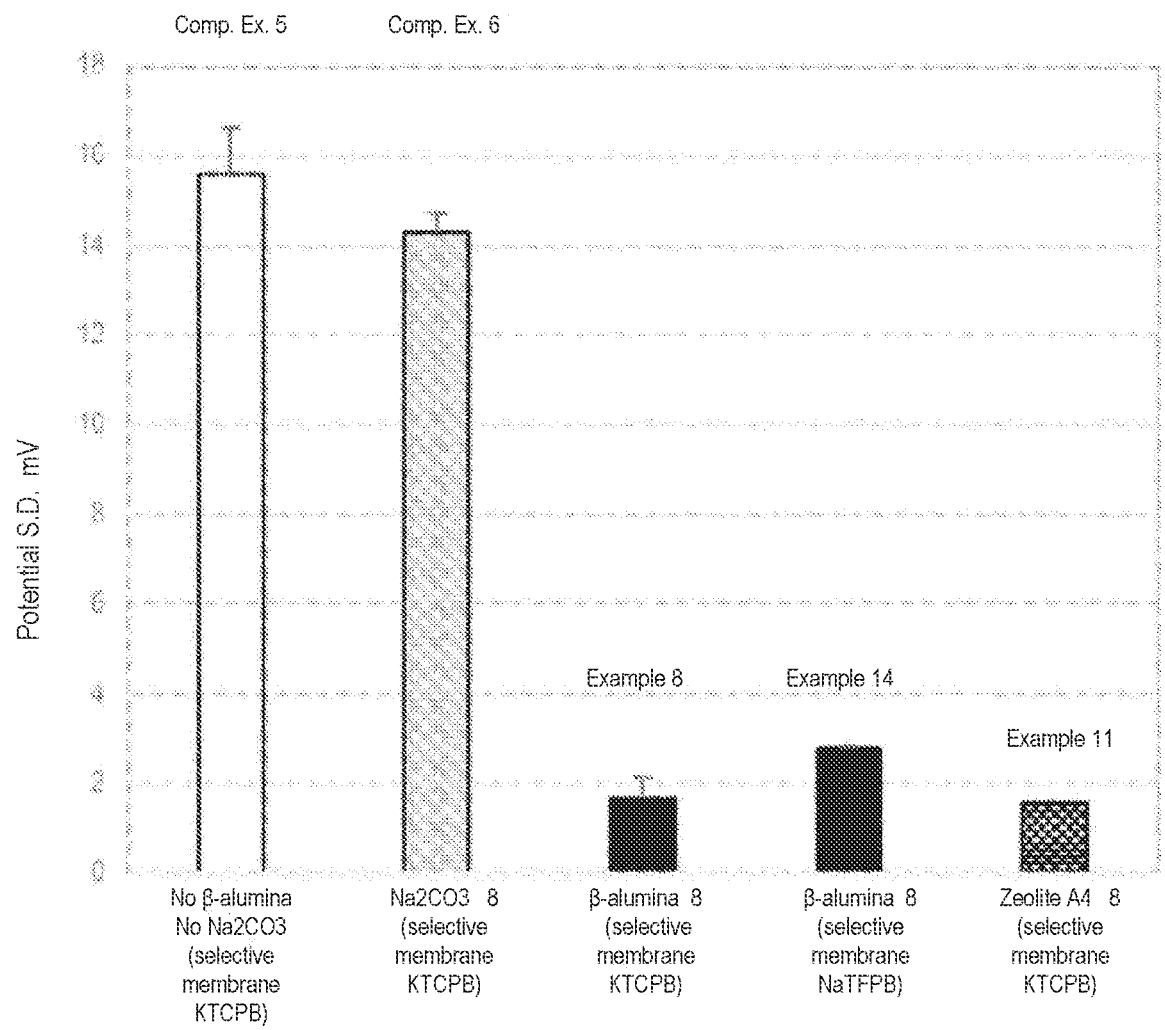
FIG. 27 shows the potential measurement result of Test Example 10; the vertical axis shows the standard deviation of the potential of the K10 mM solution.

The results are shown in FIG. 27. The results show that the potential of $Na_2CO_3$, which is a non-solid electrolyte, fluctuates, whereas the potential of β-alumina and zeolite, which are solid electrolytes, fluctuate less regardless of the ion species in the selective membrane.

Test Example 11

Potential Stability of Electrode Used for Reference Electrode 3

Test Example 11-1

Preparation of Electrodes for Reference Electrode (Examples 15 and 16)

A PVC film of an ionic liquid gel was prepared, wherein the ratio of PVC to plasticizer is 1:2, and 4 parts by mass of ionic liquid [TBMOEP$^+$][C1C1N$^-$] is dissolved in a THF solution, 20 μL is dropped onto the internal solid layer, and the mixture is heated and dried at 60° C. In Example 15, the plasticizer was NPOE, and in Example 16, the plasticizer was TEHP. Note that TBMOEP indicates tributyl (2-methoxyethyl) phosphonium bis-(trifluoromethanesulfonyl) imide (tributyl (2-methoxyethyl) phosphonium bis (trifluoromethanesulfonyl) imide). For the ion-selective electrodes used in the potential measurements below, the mass ratio of the internal solid layer and the plasticizer in the ionic liquid gel PVC film are shown in the table below.

TABLE 11

|  | Internal solid layer | | | | |
|---|---|---|---|---|---|
|  | Solid electrolyte β-alumina | Metal oxide $Na_{0.33}MnO_2$ | Conductive agent AB | Binder PVDF | Ionic liquid gel PVC Plasticizer |
| Working Ex. 15 | 8 | 8 | 1 | 1 | NPOE |
| Working Ex. 16 | 8 | 8 | 1 | 1 | TEHP |

Test Example 11-2

Potentiometric Measurement

The same procedure as in Test Example 1-3 was carried out except that electrodes (Examples 15 and 16) were used instead of ion-selective electrodes, a K concentration of 1, 10, 100 mM as was used an electrolyte solution, an Na concentration of 140 mM was used, an Ag/AgCl (internal solution: saturated KCl) electrode having a commercially available internal solution was used as the reference electrode. In this test, after stabilizing each electrode with K1 mM solution, it was immersed in 10 mM solution, 100 mM solution, and 1 mM solution in order, and the absolute value of the difference between the measured potential 1 minute after immersion and the last measured potential of K1 mM solution was calculated.

Figure 28:
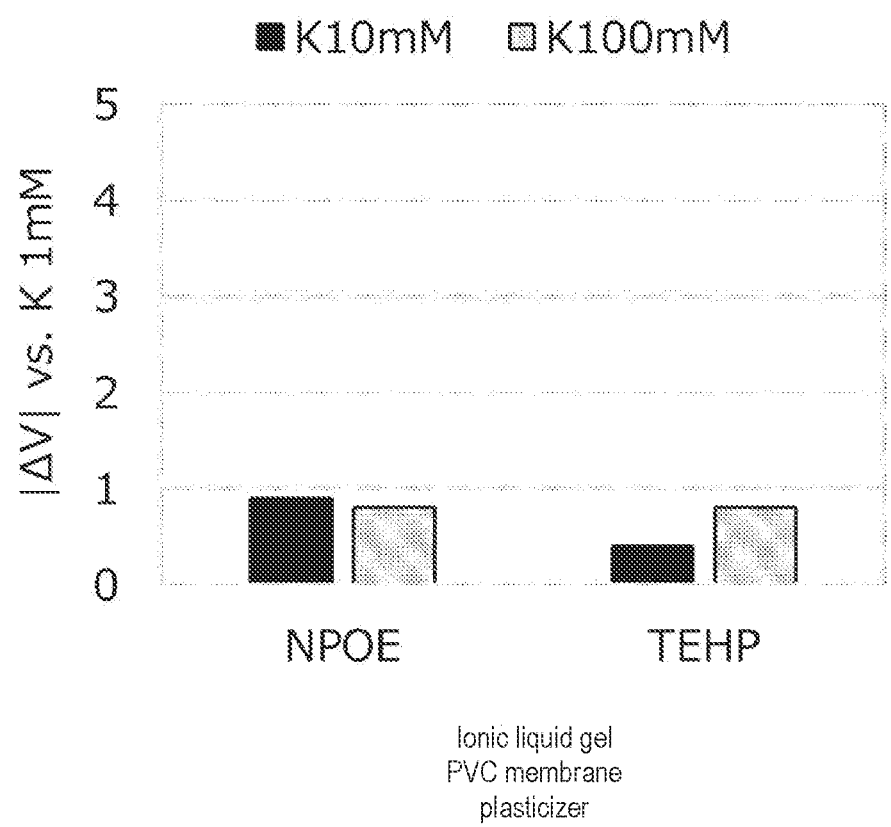
FIG. 28 shows the potential measurement result of Test Example 11; the vertical axis shows the absolute value of the difference between the measured potential 1 minute after immersion and the last measured potential of the K1 mM solution after sequential immersion in 10 nM solution, 100 mM solution, and 1 mM solution after stabilizing each electrode with K1 mM solution.

Test Example 11 Results The results are shown in FIG. 28. When any of the plasticizers was used, the potential difference was 1 mV or less regardless of the KCl concentration, and the potential was stable.

What is claimed is:

1. An ion sensor comprising:
   an insulating substrate;
   an ion-selective electrode on the insulating substrate; and
   a reference electrode on the insulating substrate, wherein
   the ion-selective electrode comprises:
   a first internal solid layer containing metal oxide and solid electrolyte;
   a first electrode material; and
   an ion-selective membrane, wherein
   the first internal solid layer is sandwiched between the first electrode material and the ion-selective membrane in a thickness direction of the first internal solid layer, the ion-selective membrane comprises a multi-layer structure including a plurality of layers having the same or different compositions from each other, the first electrode material comprises a multi-layer structure including a plurality of layers having different compositions from each other, the first internal solid layer is provided to cover a side surface of the first electrode material, the ion-selective membrane is provided to cover a side surface of the first internal solid layer so as not to expose the first internal solid layer, the reference electrode comprises:
- a second internal solid layer containing metal oxide and solid electrolyte;
- a second electrode material; and
- a salt bridge layer, wherein the second internal solid layer is sandwiched between the second electrode material and the salt bridge layer in a thickness direction of the second internal solid layer, the salt bridge layer comprises a multi-layer structure including a plurality of layers having different compositions from each other, and the second electrode material comprises a multi-layer structure including a plurality of layers having different compositions from each other.

2. The ion sensor according to claim 1, wherein the solid electrolyte of at least one selected from the group consisting of the first internal solid layer and the second internal solid layer is an ion conductive ceramics.

3. The ion sensor according to claim 1, wherein the solid electrolyte of at least one selected from the group consisting of the first internal solid layer and the second internal solid layer is a potassium ion conductive ceramics.

4. The ion sensor according to claim 1, wherein the solid electrolyte of at least one selected from the group consisting of the first internal solid layer and the second internal solid layer is β"-alumina or β-alumina.

5. The ion sensor according to claim 1, wherein the metal oxide of at least one selected from the group consisting of the first internal solid layer and the second internal solid layer is an ion-electron conductor.

6. The ion sensor according to claim 1, wherein the metal oxide of at least one selected from the group consisting of the first internal solid layer and the second internal solid layer is an ion-electron conductor for potassium ions.

7. The ion sensor according to claim 6, wherein the metal oxide of the at least one selected from the group consisting of the first internal solid layer and the second internal solid layer is $M_xMnO_2$, wherein M indicates K, and x indicates an arbitrary positive number.

8. The ion sensor according to claim 7, wherein the x is 0.2 to 0.5.

9. The ion sensor according to claim 1, wherein the solid electrolyte and the metal oxide of at least one selected from the group consisting of the first internal solid layer and the second internal solid layer are in a form of particles.

10. The ion sensor according to claim 9, wherein the average particle size of the solid electrolyte of the at least one selected from the group consisting of the first internal solid layer and the second internal solid layer is smaller than the average particle size of the metal oxide of the at least one selected from the group consisting of the first internal solid layer and the second internal solid layer.

11. The ion sensor according to claim 1, wherein the mass ratio of the metal oxide to the solid electrolyte in at least one selected from the group consisting of the first internal solid layer and the second internal solid layer is from 2:1 to 1:2.

12. The ion sensor according to claim 1, wherein at least one selected from the group consisting of the first internal solid layer and the second internal solid layer contains a binder and a conductive agent.

13. The ion sensor according to claim 12, wherein the binder is at least one type selected from a group consisting of:
(A) polyvinylidene fluoride;
(B) a mixture containing styrene-butadiene latex and carboxymethyl cellulose;
(C) a mixture containing polyamide, polyimide, and carbodiimide;
(D) polytetrafluoroethylene; and
(E) acrylic emulsion.

14. The ion sensor according to claim 12, wherein the conductive agent is at least one type selected from the group consisting of carbon black, acetylene black, ketjen black, carbon nanotube, graphene, carbon powder, and graphite powder.

15. The ion sensor according to claim 1, wherein the first internal solid layer is arranged directly on the first electrode material of the ion-selective electrode, and the second internal solid layer is arranged directly on the second electrode material of the reference electrode.

16. The ion sensor according to claim 1, wherein the ion-selective membrane contains an ionophore.

17. The ion sensor according to claim 1, wherein the first internal solid layer containing the metal oxide and the solid electrolyte is electrostatically coated on the first electrode material, or the second internal solid layer containing the metal oxide and the solid electrolyte is electrostatically coated on the second electrode material.

18. The ion sensor according to claim 1, wherein the solid electrolyte of at least one selected from the group consisting of the first internal solid layer and the second internal solid layer is a sodium ion conductive ceramic.

19. The ion sensor according to claim 1, wherein the metal oxide of at least one selected from the group consisting of the first internal solid layer and the second internal solid layer is an ion-electron conductor for sodium ions.

20. The ion sensor according to claim 1, wherein the first internal solid layer comprises a multi-layer structure including a plurality of layers having different compositions from each other, and the second internal solid layer comprises a multi-layer structure including a plurality of layers having different compositions from each other.

* * * * *